(12) United States Patent
Sato

(10) Patent No.: US 7,103,837 B2
(45) Date of Patent: Sep. 5, 2006

(54) INFORMATION PROCESSING SYSTEM AND DISPLAY METHOD

(75) Inventor: Junko Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 382 days.

(21) Appl. No.: 10/236,972

(22) Filed: Sep. 9, 2002

(65) Prior Publication Data
US 2003/0056178 A1    Mar. 20, 2003

(30) Foreign Application Priority Data
Sep. 14, 2001   (JP) ............................. 2001-280387

(51) Int. Cl.
*G06F 15/00*   (2006.01)
(52) U.S. Cl. ....................... 715/527; 715/525; 715/526
(58) Field of Classification Search ................ 715/527, 715/526, 525
See application file for complete search history.

(56) References Cited

U.S. PATENT DOCUMENTS

| | | | | |
|---|---|---|---|---|
| 5,278,952 A | * | 1/1994 | Kira et al. .................. | 715/525 |
| 5,714,973 A | * | 2/1998 | Takahashi et al. .......... | 345/658 |
| 5,748,484 A | * | 5/1998 | Cannon et al. ............. | 700/233 |
| 6,324,554 B1 | * | 11/2001 | Watanabe et al. ........... | 715/517 |
| 6,556,310 B1 | * | 4/2003 | Livingston .................. | 358/1.18 |
| 6,642,943 B1 | * | 11/2003 | Machida ..................... | 715/763 |
| 6,694,487 B1 | * | 2/2004 | Ilsar ........................... | 715/527 |
| 6,766,332 B1 | * | 7/2004 | Miyazaki et al. ........... | 707/102 |
| 6,819,440 B1 | * | 11/2004 | Varga et al. ................ | 358/1.13 |

* cited by examiner

*Primary Examiner*—Stephen Hong
*Assistant Examiner*—Kristina Honeycutt
(74) *Attorney, Agent, or Firm*—Fitzpatrick, Cella, Harper & Scinto

(57) ABSTRACT

Disclosed is an information processing system having a print preview function for displaying a preview of the printed state of a document before the document is printed. If a double-sided printing function has been set by a user interface for setting various print functions for a document, a preview of front and back pages is displayed with the spacing between the front and back pages narrowed or the display positions thereof made different from each other in such a manner that pairs of front and back pages may be recognized at a glance.

13 Claims, 22 Drawing Sheets

FIG. 4A

| NO | ATTRIBUTE INFORMATION | | REMARKS |
|---|---|---|---|
| 1 | PRINTING METHOD | SINGLE-SIDED / DOUBLE-SIDED / BOOKBINDING PRINTING | |
| 2 | PAPER SIZE | MANUSCRIPT SIZE / FIXED SIZE | • SPECIFIES Z FOLD IF "A4 + A3", "B4 + B3", "LETTER + LEISURE (11 × 17)" IS DESIGNATED<br>• MANUSCRIPT SIZE OF FIRST CHAPTER / FIRST PAGE IS SELECTED AUTOMATICALLY IF BOOKBINDING PRINTING OR N-up PRINTING HAS BEEN SPECIFIED |
| 3 | PAPER ORIENTATION | PORTRAIT / LANDSCAPE | • SELECTABLE ONLY IN CASE OF FIXED SIZE |
| 4 | BINDING MARGIN / BINDING DIRECTION | | • SHIFT / ENLARGE OR REDUCE CAN BE SPECIFIED |
| 5 | N-up PRINTING | NUMBER OF PAGES / LAYOUT ORDER / BOUNDARY LINE / LAYOUT POSITION, ETC. | • NINE PATTERNS OF LAYOUT POSITIONS<br>• SAME-SIZE PRINTING CAN BE SPECIFIED |
| 6 | ENLARGE / REDUCE | ON / OFF | ON OR OFF CAN BE SPECIFIED AUTOMATICALLY IF FIXED SIZE IS SELECTED FOR PAPER SIZE OR N-up PRINTING IS SELECTED |
| 7 | WATERMARK | | • LOGICAL PAGE UNITS AND PHYSICAL PAGE UNITS CAN BE SPECIFIED SEPARATELY<br>• APPLICABLE TO ALL CHAPTERS / ALL PAGES |

FIG. 4B

| | | |
|---|---|---|
| 8 | HEADER / FOOTER | • LOGICAL PAGE UNITS AND PHYSICAL PAGE UNITS CAN BE SPECIFIED SEPARATELY<br>• APPLICABLE TO ALL CHAPTERS / ALL PAGES |
| 9 | PAPER DISCHARGE METHOD | STAPLED / PUNCHED | • STAPLING / PUNCHING ONLY FOR SINGLE-SIDED / DOUBLE-SIDED PRINTING<br>• STAPLING AT ONE LOCATION / TWO LOCATIONS |
| 10 | BOOKBINDING SPECIFICS | OPENING DIRECTION / CENTER BINDING / ENLARGE OR REDUCE / BINDING MARGIN / SEPARATE VOLUMES SPECIFIED | • ONLY AT TIME OF BOOKBINDING PRINTING |
| 11 | FRONT-COVER STOCK / BACK-COVER STOCK | | • SPECIFIES PRINTING WITH REGARD TO FRONT-COVER STOCK 1/2, BACK-COVER STOCK 1/2<br>• SPECIFIED PAPER-FEED PORT (INCLUSIVE OF INSERTER) |
| 12 | TAB STOCK | | • PRINTING OF CHARACTER STRINGS ON TABS AND ANNOTATING OF INDEX STOCK CAN BE SET<br>• BOOKBINDING CANNOT BE SPECIFIED |
| 13 | HEAVY STOCK | | • SPECIFIES PAPER-FEED PORT (INCLUSIVE OF INSERTER)<br>• MANUSCRIPT DATA CAN BE PRINTED ON INSERTED PAPER<br>• BOOKBINDING CANNOT BE SPECIFIED |
| 14 | CHAPTER BREAK | NONE / CHANGE PAGE / CHANGE PAPER | • "CHANGE PAPER" FIXED IF INDEX STOCK OR HEAVY STOCK HAS BEEN SPECIFIED<br>• SINGLE-SIDED PRINTING: "CHANGE PAPER" |

FIG. 5

| NO. | ATTRIBUTE INFORMATION | | REMARKS |
|---|---|---|---|
| 1 | PAPER SIZE | MANUSCRIPT SIZE / FIXED SIZE | • "CHANGE PAPER" SPECIFIED AUTOMATICALLY IF FIXED SIZE SELECTED<br>• CHANGEABLE ONLY WITH SPECIFIED PAPER IF PLURALITY OF PAPERS SELECTED IN BOOK; PAPER SIZE CHANGEABLE EVEN IN CASE OF DESIGNATION TO CONFORM TO BOOK |
| 2 | PAPER ORIENTATION | PORTRAIT / LANDSCAPE | • SELECTABLE ONLY IN CASE OF FIXED SIZE |
| 3 | N-up PRINTING SPECIFIED | NUMBER OF PAGES / LAYOUT ORDER / BOUNDARY LINE / LAYOUT POSITION, ETC. | • NINE PATTERNS OF LAYOUT POSITIONS<br>• SAME-SIZE PRINTING CAN BE SPECIFIED |
| 4 | ENLARGE / REDUCE | ON / OFF | • ON OR OFF CAN BE SPECIFIED AUTOMATICALLY IF FIXED SIZE IS SELECTED FOR PAPER SIZE OR N-up PRINTING IS SELECTED |
| 5 | WATERMARK | DISPLAY / DO NOT DISPLAY | • SPECIFIES WHETHER OR NOT TO DISPLAY ALL WATERMARKS SPECIFIED IN BOOK |
| 6 | HEADER / FOOTER | DISPLAY / DO NOT DISPLAY | • SPECIFIES WHETHER OR NOT TO DISPLAY ALL HEADERS / FOOTERS SPECIFIED IN BOOK |
| 7 | PAPER DISCHARGE METHOD | STAPLED | • CAN BE TURNED OFF IF STAPLING IS SPECIFIED IN BOOK; DEFAULT IS TURNED ON |

FIG. 6

| NO | ATTRIBUTE INFORMATION | | REMARKS |
|---|---|---|---|
| 1 | SPECIFIES PAGE ROTATION | | • 0 / 90 / 180 / 270° CAN BE SPECIFIED |
| 2 | WATERMARK | DISPLAY / DO NOT DISPLAY | • SPECIFIES WHETHER OR NOT TO DISPLAY ALL WATERMARKS SPECIFIED IN BOOK |
| 3 | HEADER / FOOTER | DISPLAY / DO NOT DISPLAY | • SPECIFIES WHETHER OR NOT TO DISPLAY ALL HEADERS / FOOTERS SPECIFIED IN BOOK |
| 4 | ZOOM | 50% - 200% | • SPECIFIES RELATIVE MAGNIFICATION IN WHICH SIZE SUITED TO VIRTUAL LOGICAL PAGE AREA IS 100% |
| 5 | LAYOUT POSITION | | • NINE FIXED PATTERNS, AND SPECIFIES ANY POSITION |
| 6 | ANNOTATION | | |
| 7 | VARIABLE ITEM | | |
| 8 | PAGE SPLIT | | |

INFORMATION PROCESSING SYSTEM AND DISPLAY METHOD

FIELD OF THE INVENTION

This invention relates to an information processing system and a display method having a print preview function for displaying a preview of the printed state of a document before the document is printed.

BACKGROUND OF THE INVENTION

When types of data differ, as when dealing with characters, tables and images, the structures that define the data and the operation for editing the data also differ. For this reason, various application programs that conform to particular types of data are available. The user employs these application programs selectively depending upon the type of data to be edited. For example, the user employs a word processing program to edit text, a spreadsheet program to edit tables and an image editing program to edit images.

Thus, the general practice is for the user to choose an application program for each type of data to be edited. Usually, however, a document to be created by the user is more likely to be composed of various types of data, such as text and tables or text and images, than of only a single type of data, such as text only, tables only or images only. Accordingly, in order to create a target document that contains data of a plurality of types, the user is required to print out the data on an application-by-application basis utilizing the print function with which each application is equipped, and then combine the printouts in a desired order.

Alternatively, a program referred to as a so-called "office suite" that forms a single, integrated application by various applications is provided with a function through which a single document is constructed by combining data generated by each of the various applications. When such an integrated application is used, the user is capable of gathering data created in each of the applications into a single target document by a specific application included in the integrated application.

Further, a print preview function is well known in the art. When data that is a document or image that has been edited by an application program for editing documents or images is to be printed, the print preview function displays the image to be printed on a display screen in the print layout so that the user may preview the image before it is actually printed on paper. The print preview function is provided in the application program and is a function solely for displaying a preview image.

By utilizing the print preview function to check an image that will be printed, the user can re-edit the image by the application program until the ideal layout is achieved.

However, in a case where the user creates a single target document by combining printouts using various applications, the user, in order to, say, assign a page number to each page, is required to first print out all of the necessary data, assemble the printouts as a document and then decide the page number to be assigned. The page numbers decided are then written in by each application for every page of the manuscript created by the application (the page is referred to as a "logical page" or "manuscript page"). Even if an application program has a function for assigning page numbers, any discontinuous portions that may exist will still require that the user designate the page numbers for these portions. Further, if pages of a target document are rearranged, then the page numbers of these pages must be reassigned accordingly. Alternatively, even in a case where the format of a document is simply altered but the content of data is not changed, as when a plurality of manuscript pages are collected together on one page (referred to as a "physical page" or "printed page") serving as a printout or a change is made from single-sided printing to double-sided printing, re-editing or re-printing by the application is required.

Thus, because the applications that are capable of managing data differ for each type of data, the user must supply his/her own manpower to interface the applications. This requires a great amount of labor on the part of the user and invites a decline in productivity. Furthermore, too much human intervention tends to produce errors.

On the other hand, in a case where a target document is created utilizing the aforementioned integrated application, various data can be laid out while still in the form of data without being printed out. As a result, less labor is required in comparison with the case where the target document is created by combining printouts. However, applications for editing and creating various data that are capable of being included in an integrated application are limited, and the user may not always be capable of using the application desired. In addition, a target document that has been created by an integrated application is a single document file, and management such as editing and output is carried out on a file-by-file basis. Even if it is attempted to set a format with regard to part of a document file, therefore, limitations imposed by the functions of the application are many, and altering format setting with regard to a portion whose format is to be changed necessitates re-printing. This is no different from the above-described method in that considerable labor is required and productivity suffers.

Furthermore, the print preview function possessed by conventional applications cannot display an image that reflects various types of printing setups, such as double-sided printing or bookbinding printing, as a preview image. Further, with recent printer drivers, consideration has been given to the provision of a print preview function that takes into account print settings that have been configured via the GUI of the printer driver. However, even if double-sided printing has been specified by the print settings, the front and back sides are displayed in order on the same plane and it is difficult for the user to distinguish which are the front and back sides. In addition, space may be wasted, depending upon the display area.

SUMMARY OF THE INVENTION

Accordingly, an object of the present invention is to present a preview display so adapted that the front and back sides of a page can be ascertained at a single glance before printing is performed.

Another object of the present invention is to utilize a preview display area effectively.

According to the present invention, the foregoing objects are attained by providing an information processing system having a print preview function for displaying a preview of the printed state of a document before the document is printed, comprising: a user interface for setting various print functions for a document; and display control means for displaying a preview of front and back pages to be printed in such a manner that the front and back pages can be distinguished from each other in a case where a double-sided printing function has been set by the user interface.

According to an embodiment of the present invention, there is provided a display method for displaying a preview of the printed state of a document before the document is printed, comprising: a setting step of setting various print functions for a document; and a display control step of displaying a preview of front and back pages to be printed in such a manner that the front and back pages can be distinguished from each other in a case where a double-sided printing function has been set at the setting step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4A and 4B are diagrams showing a list of page attributes;

FIG. 5 is a diagram illustrating a list of chapter attributes;

FIG. 6 is a diagram showing a list of page attributes;

DESCRIPTION OF THE PREFERRED EMBODIMENT

<System Overview>

Reference will be had to FIGS. 1 to 12 to describe an overview of a document processing system suited for an information processing system according to the present invention. This document processing system includes an electronic manuscript writer for converting a data file, which has been created by an ordinary application, to an electronic manuscript file, and a bookbinding application that provides a function for editing this electronic manuscript file. This system makes it possible to create and edit a document in which the created data has been merged and is capable of performing document editing efficiently by enhancing operability.

<System Configuration and Operation>

Figure 1:
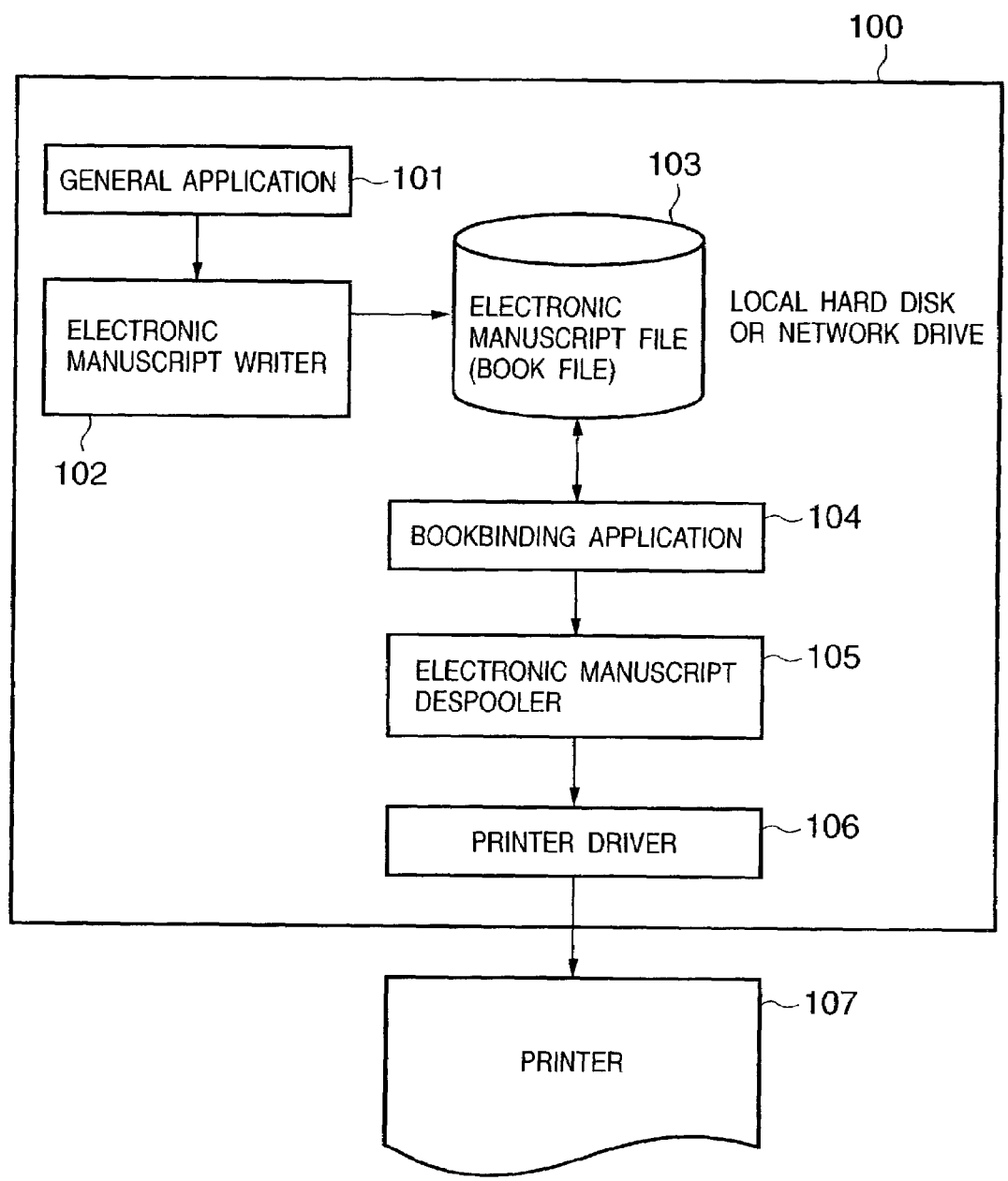
FIG. 1 is a block diagram of a stand-alone document processing system.

FIG. 1 is a diagram illustrating the software configuration of a document processing system according to this embodiment. This document processing system is implemented by a digital computer 101, which is an ideal mode for practicing the information processing system according to the invention. The general application 101 shown in FIG. 1 is constituted by application programs that provide functions such as word processing, spreadsheets, photo re-touch, drawing or painting, presentations and text editing and has a print function with regard to an operating system (OS). These applications utilize a prescribed interface (referred to generally as a "GDI"), which is provided by the OS, when application data such as created document data and image data is printed. More specifically, in order to print created application data, the application 101 transmits a predetermined output command (referred to as a "GDI function"), which has a format that is dependent upon the OS, to an output module of the OS that provides the above-mentioned interface. Upon receiving this output command, the output module converts the output command to a format in which it can be processed by an output device such as a printer, and outputs a draw command (referred to as a "DDI function") obtained by the conversion. Since the format in which processing is possible by the output device differs depending upon the device type, manufacturer and model, a device driver is provided for every device. The device drivers are utilized in the operating system to convert commands, generate print data and generate print jobs by describing the data in JL (Job Language). In a case where Microsoft's Windows is utilized as the operating system, this entails using a GDI (Graphic Device Interface) module as the above-mentioned output module.

An electronic manuscript writer 102 is an improvement upon the aforesaid device driver and constitutes a software module provided in order to implement this document processing system. The electronic manuscript writer 102 is not targeted on a specific output device and converts an output command to a form in which processing is possible by a bookbinding application 104 or printer driver 106. The form after conversion (referred to as an "electronic manuscript format" below) by the electronic manuscript writer 102 is not particularly limited so long as a manuscript in page units can be expressed using a detailed format. Among the essential standard formats available, the PDF format from Adobe Systems or the SVG format can be adopted as the electronic manuscript format.

In a case where the electronic manuscript writer 102 is utilized from the general application 101, printing is executed after the electronic manuscript writer 102 is designated as the device driver used for output. However, an electronic manuscript file created by the electronic manuscript writer 102 does not possess, as is, a perfect format as an electronic manuscript file. As a result, what designates the electronic manuscript writer 102 as the device driver is the bookbinding application 104. Conversion of application data to an electronic manuscript file is executed under the management of the bookbinding application 104. The latter takes a new incomplete electronic manuscript file, which has been generated by the electronic manuscript writer 102, and completes it as an electronic manuscript file having a format described below. In a case where it is necessary to identify this point clearly, a file created by the electronic manuscript writer 102 will be referred to below as an "electronic manuscript file", and an electronic manuscript file given structure by the bookbinding application 104 will be referred to below as a "book file". Further, in a case where it is unnecessary to particularly distinguish among files, document files, electronic manuscript files and book files generated by an application shall all be referred to as document files (or document data).

By thus designating the electronic manuscript writer 102 as the device driver and printing data by the general application 101, application data is converted to an electronic manuscript format in which the units are pages (referred to as "logical pages" or "manuscript pages" below) defined by the application 101, and the data obtained by the conversion is stored as an electronic manuscript file 103 on a storage medium such as a hard disk. The hard disk may be a local drive provided in the computer that implements the document processing system of this embodiment or a drive provided over a network in a case where the system is connected to the network.

The bookbinding application 104 reads in the electronic manuscript file (or book file) and provides the user with a function that is for editing this file. However, the bookbinding application 104 does not provide a function for editing the content of each page; it provides a function for editing chapter and book structure (described later), in which the page serves as the minimum unit.

When the book file 103 that has been edited by the bookbinding application 104 is printed, an electronic manuscript despooler 105 is started up by the bookbinding application 104. The electronic manuscript despooler 105 reads a designated book file out of the hard disk, generates an output command suited to the output module of the above-mentioned OS in order to print each page in a format described in the book file, and outputs this command to the output module (not shown). At this time a printer driver 106 for a printer 107 used as the output device is designated as the device driver. The above-mentioned output module converts the received command to a device command and outputs the command to the designated printer driver 106 for the printer 107. The printer driver 106 converts this command to a command in page description language or the like capable of being interpreted and executed by the printer 107. The command obtained by the conversion is transmitted from the printer driver 106 to the printer 107 via a system spooler (not shown), and the image corresponding to the command is printed by the printer 107.

Figure 2:
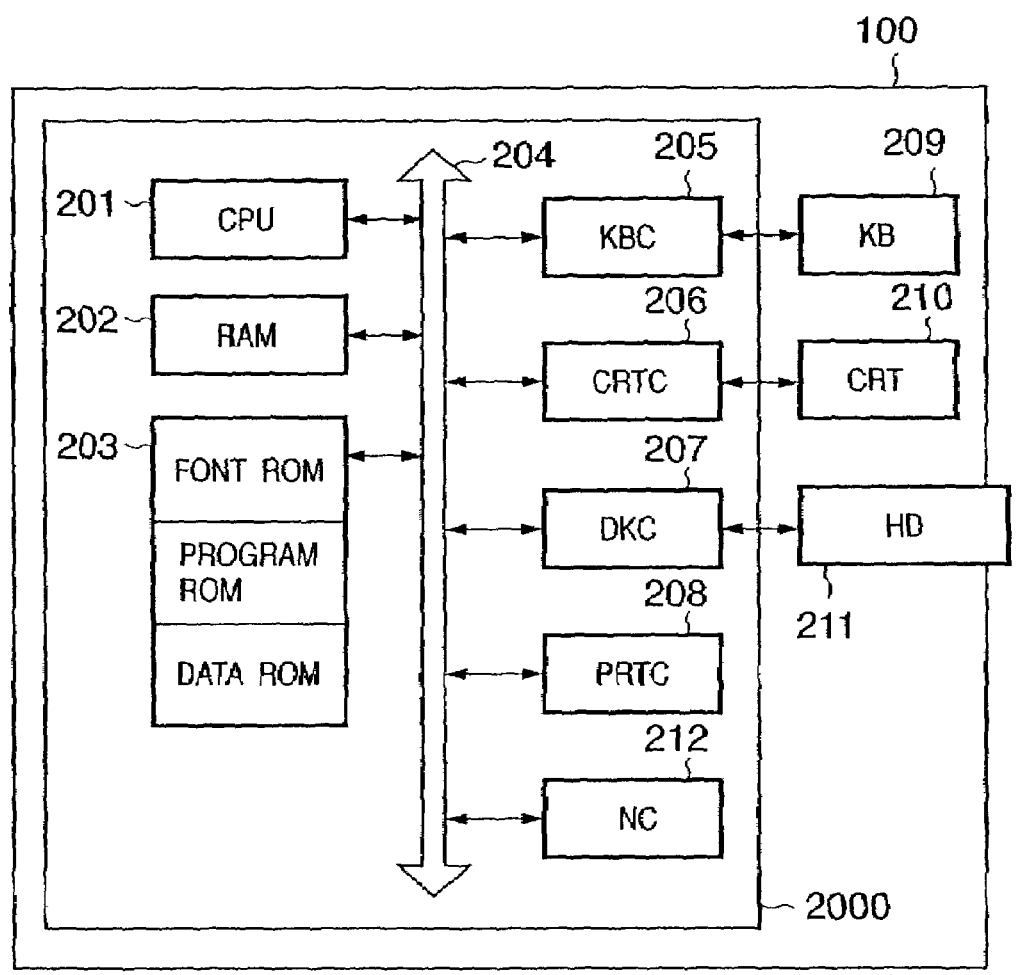
FIG. 2 is a block diagram of a computer for implementing this document processing system.

FIG. 2 is a hardware block diagram of the computer 100. In FIG. 2, a CPU 201 executes an operating system or a program such as the general application program or bookbinding application stored in a program ROM of a ROM 203 or loaded from a hard disk 211 to a RAM 202, and implements the software configuration of FIG. 1 and the procedure of a flowchart, described later. The RAM 202 functions as the main memory and work area of the CPU 201. A keyboard controller (KBC) 205 controls inputs from a keyboard 209 and pointing device, which is not shown. A CRT controller (CRTC) 206 controls a display presented by a CRT display 210. A disk controller (DKC) 207 controls access to a hard disk (HD) 211, which stores a booting program, various applications, font data, user files and editing files, described later, and to a floppy disk, which is not shown. A PRTC 208 controls an exchange of signals with a connected printer 107. An NC 212 is connected to the Internet and executes communication control processing for communicating with another device connected to the network.

<Format of Electronic Manuscript Data>

The data format of a book file will be described before discussing the details of the bookbinding application 104. A book file has a 3-layer hierarchical structure modelled after writing on a paper medium. The uppermost layer is referred to as a "book" and is modelled after a book of a single volume. Here attributes relating to the book in general are defined. The underlying intermediate layer corresponds to a chapter in book terminology and therefore is referred to as a "chapter". For each chapter it is possible to define a chapter attribute. The lowermost layer is referred to as a "page" and corresponds to each page defined by the application program. For each page there can be defined a page attribute. A single book may include a plurality of chapters, and a single chapter can include a plurality of pages.

Figure 3A:
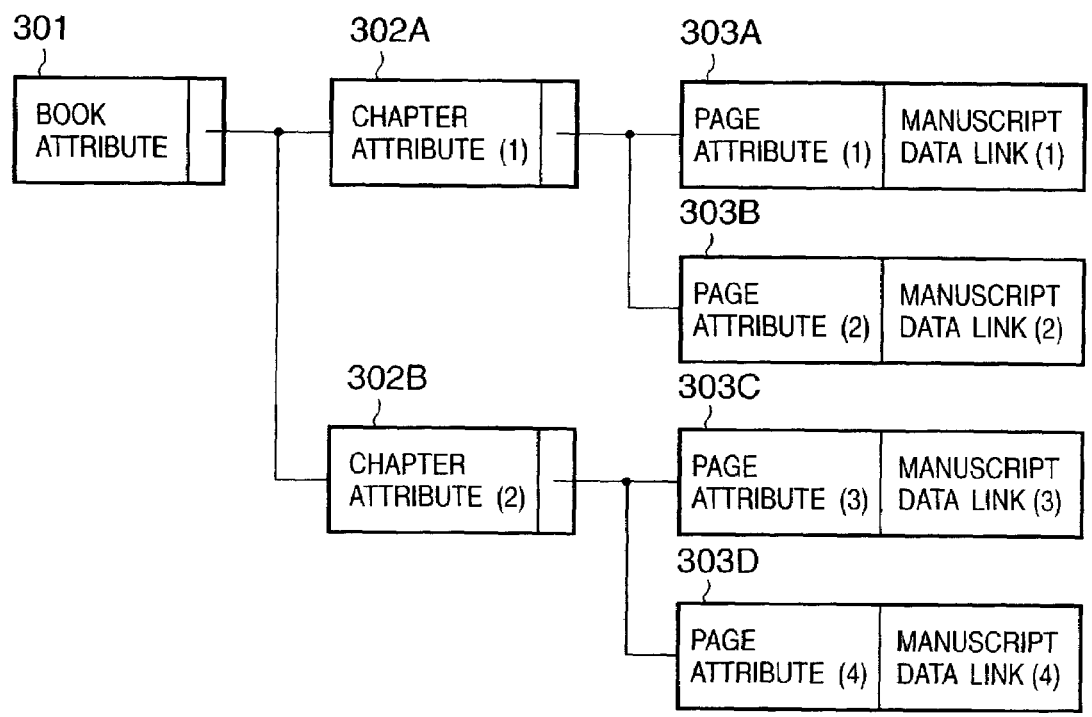
FIGS. 3A and 3B are diagrams illustrating an example of the structure of a book file.
Figure 3B:
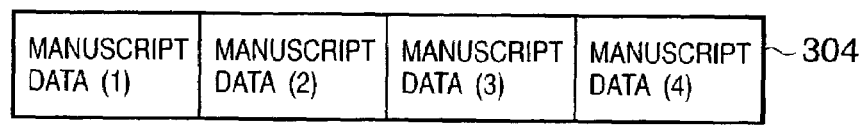

FIG. 3A is a diagram schematically illustrating an example of the format of a book file. A book, chapters and pages in the book file of this example are displayed by nodes corresponding to them. One book file contains one book. Since book and chapter are concepts for defining a structure in the form of a book, defined attribute values and links to lower layers are included as substance. A page has as substance the data of each page output by the application program. A page, therefore, includes not only the attribute value but also the substance (manuscript page data) of a manuscript page and links to other items of manuscript page data.

It should be noted that there are cases where a printed page for when the page is to be output to a paper medium or the like includes a plurality of manuscript pages. Items relating to this structure are not displayed by links but are displayed as attributes in each of the book, chapter and page layers.

In FIG. 3A, a book attribute has been defined for a book 301 and two chapters 302A, 302B have been linked to it. The fact that the chapters 302A, 302B are contained in the book 301 is displayed by the links. Pages 303A, 303B are linked to chapter 302A. This indicates that the pages are contained in the chapter. Attribute values have been defined for each of the pages 303A, 303B, and the pages include links to manuscript page data (1), (2), which is the substance of these pages. These links point to data (1), (2) of manuscript page data 304 illustrated in FIG. 3B and indicate the fact that the substance of pages 303A, 303B is the manuscript page data (1), (2).

FIGS. 4A and 4B are diagrams showing a list of book attributes. Lower-layer attribute values are adopted preferentially with regard to items that are definable redundantly with lower layers. With regard to items included only in book attributes, therefore, the value defined as a book attribute will be a valid value throughout the entire book. However, items that duplicate those in lower layers have the meaning of default values in a case where they have not been defined in lower layers. It should be noted that each item illustrated may not correspond to one item and may include a plurality of related items.

FIG. 5 is a list of chapter attributes and FIG. 6 a list of page attributes. The relationship between chapter attributes and page attributes is similar to the relationship between book attributes and the attributes of lower layers.

As will be apparent from FIGS. 4A to 6, items specific to book attributes are six in all, namely printing method, bookbinding specifics, front cover/back cover, tab stock, heavy stock and chapter breaks. These are items defined throughout the book. Three values, namely single-sided printing, double-sided printing and bookbinding printing, can be specified as attributes of the printing method. Bookbinding printing is a method of gathering a separately specified number of sheets together in a cluster, folding the sheets in half and then binding the clusters together, whereby printing is performed in a format that makes bookbinding possible. In a case where bookbinding printing has been specified, opening direction and number of sheets in each cluster can be specified as the bookbinding-specifics attribute.

When an electronic manuscript file to be gathered together as a book is printed, the attribute relating to front cover/back cover involves specifying whether to add on paper to serve as a front cover and back cover, and specifying the content of printing to be performed on the added sheets of paper. The tab stock attribute involves specifying insertion of separately prepared tab stock into the printing apparatus and specifying content to printed on the tab stock (tab) as a chapter break. This attribute becomes effective in a case where the printing apparatus used is equipped with an inserter having an insertion function for inserting paper, which is prepared separately from printing paper, at a desired position, or in a case where a plurality of paper cassettes can be used. The same holds true for the heavy stock attribute.

The heavy stock attribute involves specifying insertion of paper supplied from an inserter or paper cassette as a chapter break and, if heavy stock is inserted, specifying the source of paper feed.

The attribute relating to chapter break involves specifying whether to use new paper or whether to use a new printed page at the place of a chapter break, or specifying nothing. When single-sided printing is performed, using new paper and using a new printed page have the same meaning. When double-sided printing is performed, successive chapters are not printed on the same sheet of paper if "USE NEW PAPER" is specified, but successive chapters can be printing on the front and back sides of one sheet of paper if "USE NEW PRINTED PAGE" is specified.

With regard to chapter attributes, there are no chapter-specific items and all book attributes overlap. Accordingly, if a definition in a chapter attribute and a definition in a book attribute differ, the value defined as the chapter attributes takes precedence. There are five items common to only book attributes and chapter attributes, namely paper size, paper orientation, N-up print designation, enlarge/reduce and paper discharge method. Among these, the attribute relating to N-up print designation is an item for designating the number of manuscript pages contained on one printed page. Designatable arrays are 1×1, 1×2, 2×2, 3×3 and 4×4. The attribute relating to method of paper discharge is an item for specifying whether discharged paper is to be subjected to stapling processing. Whether this attribute is effective or not depends upon whether the printing apparatus used has a stapling function.

Items specific to page attributes are a page-rotation attribute, zoom, array designation, annotation and page splitting, etc. The page-rotation attribute is an item for specifying angle of rotation for when a manuscript page is laid out on a printed page. The zoom attribute is an items for specifying the magnification of a manuscript page. In magnification, the size of a virtual logical page area is specified as being 100%. The virtual logical page area is an area occupied by one manuscript page in a case where the manuscript page is laid out in accordance with the designation of N-up, etc. For example, in case of the 1×1 layout, the virtual logical page area is an area corresponding to one printed page. In case of the 1×2 layout, the virtual logical page area is an area obtained by reducing each side of one printed page to about 70%.

A watermark attribute and header/footer attribute are attributes shared in common with book, chapter and page. The watermark is a separately specified image or character string, etc., printed over data created in an application. The header/footer is a watermark printed in the upper and lower margins of each page. Items that can be specified by variables such as page number and date are available as the header/footer. Content that can be specified as the watermark attribute and header/footer attribute is shared in common with both chapter and page but differs from that of a book. A watermark or header/footer can be set for a book, and the manner in which a watermark or header/footer is to be printed throughout the book can be specified. On the other hand, in the case of a chapter or page, whether or not a watermark or header/footer set for the book is to be printed for the chapter or page can be specified.

<Procedure for Generating Book File>

A book file has a structure and content of the above-mentioned kind. A procedure for creating a book file by the bookbinding application 104 and electronic manuscript writer 102 will now be described. The procedure for creating the book file is implemented as part of the operation for editing a book file by the bookbinding application 104.

Figure 7:
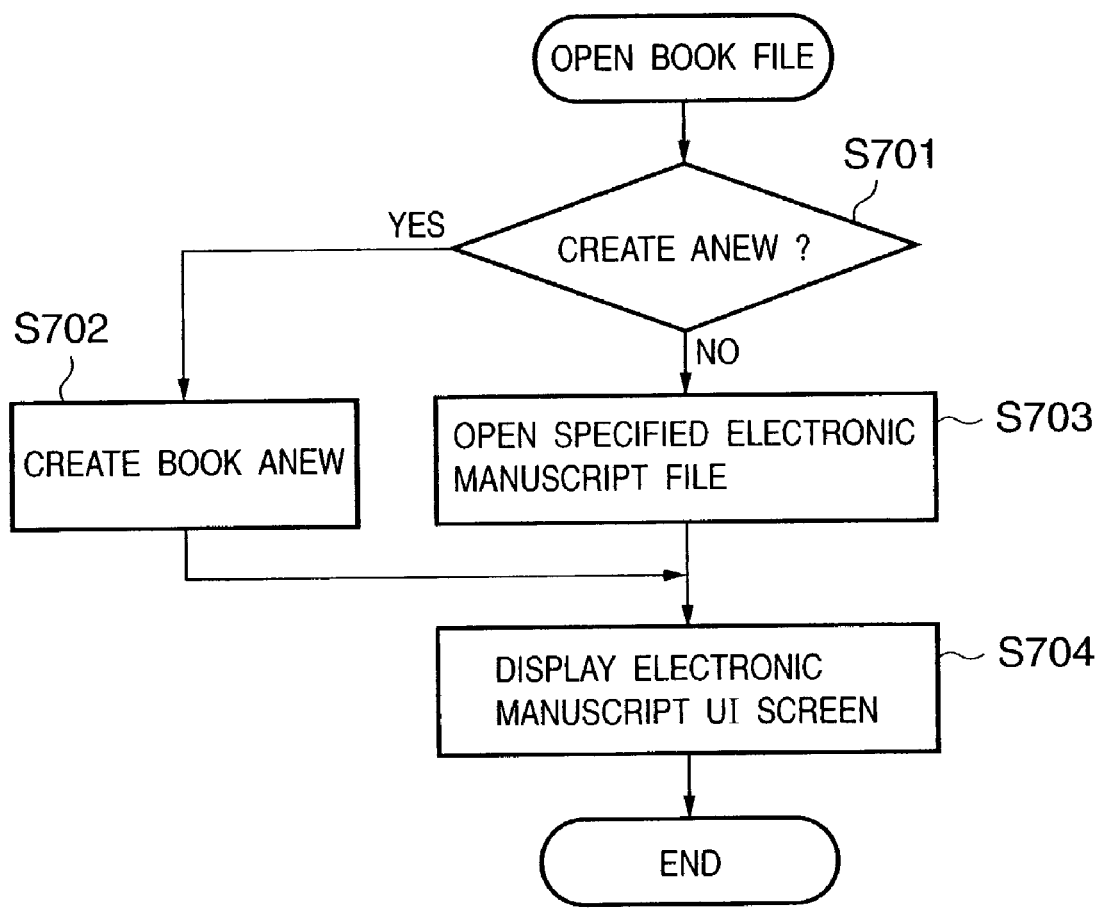
FIG. 7 is a flowchart of a procedure for opening a book file.
Figure 11:
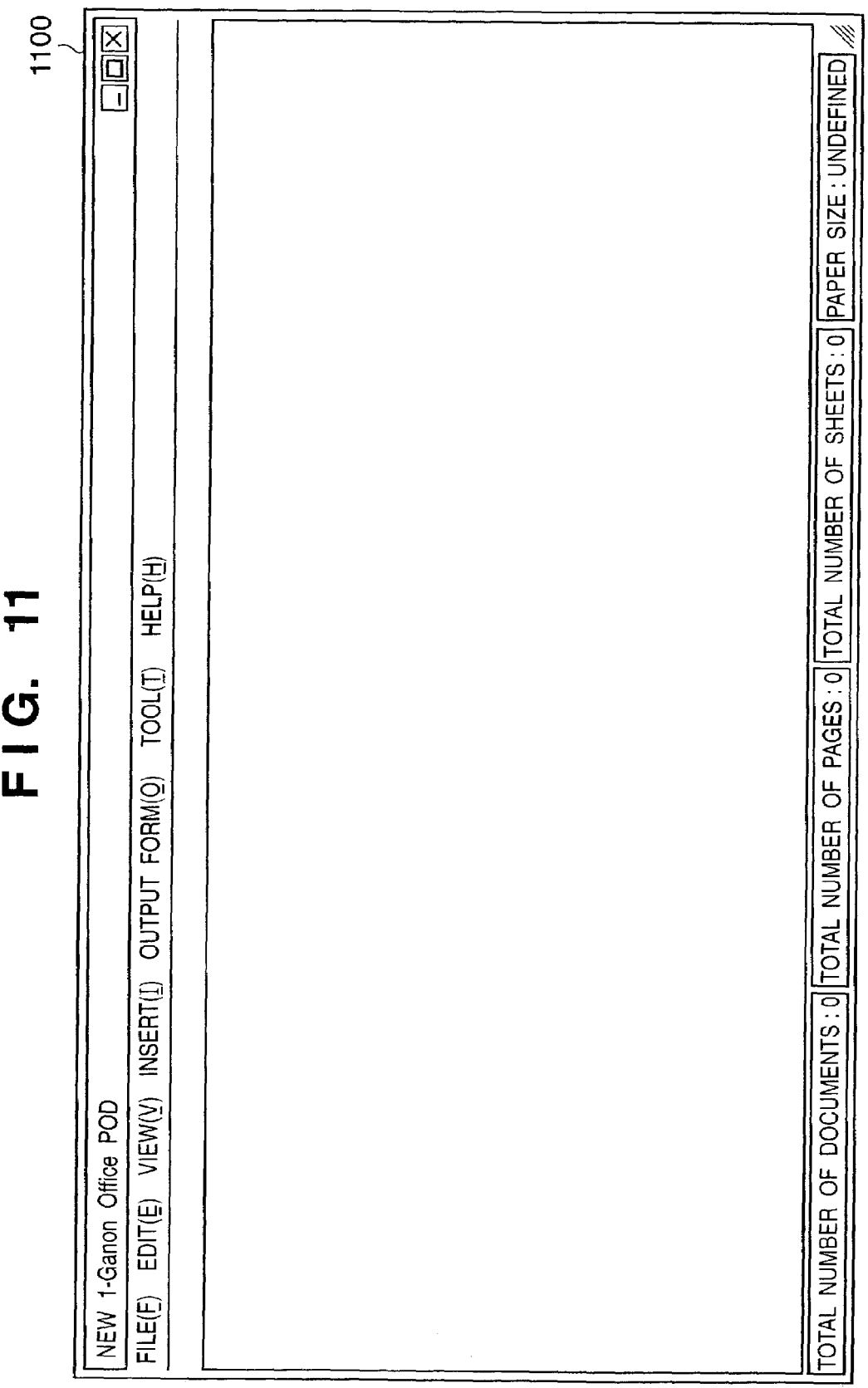
FIG. 11 is a diagram showing an example of a user interface screen for when a new book file is opened.

FIG. 7 is a flowchart of a procedure for when a book file is opened by the bookbinding application 104. First, it is determined whether the book file to be opened is one to be created anew or one that already exists (step S701). If the book file is to be created anew then a book file that does not contain chapters is created anew (step S702). If illustrated by the example of FIG. 3A, the book file to be created anew will have only the book node 301. This will be the node of a book in which links to chapter nodes do not exist. With regard to book attributes, a set of attributes prepared beforehand for creation anew is applied. A user interface (UI) screen for editing the new book file is displayed (step S703). FIG. 11 shows an example of a UI screen 1100 on which a book file is created anew. In this case, the book file does not possess substantial content and therefore nothing is displayed on the UI screen 1100.

Figure 10:
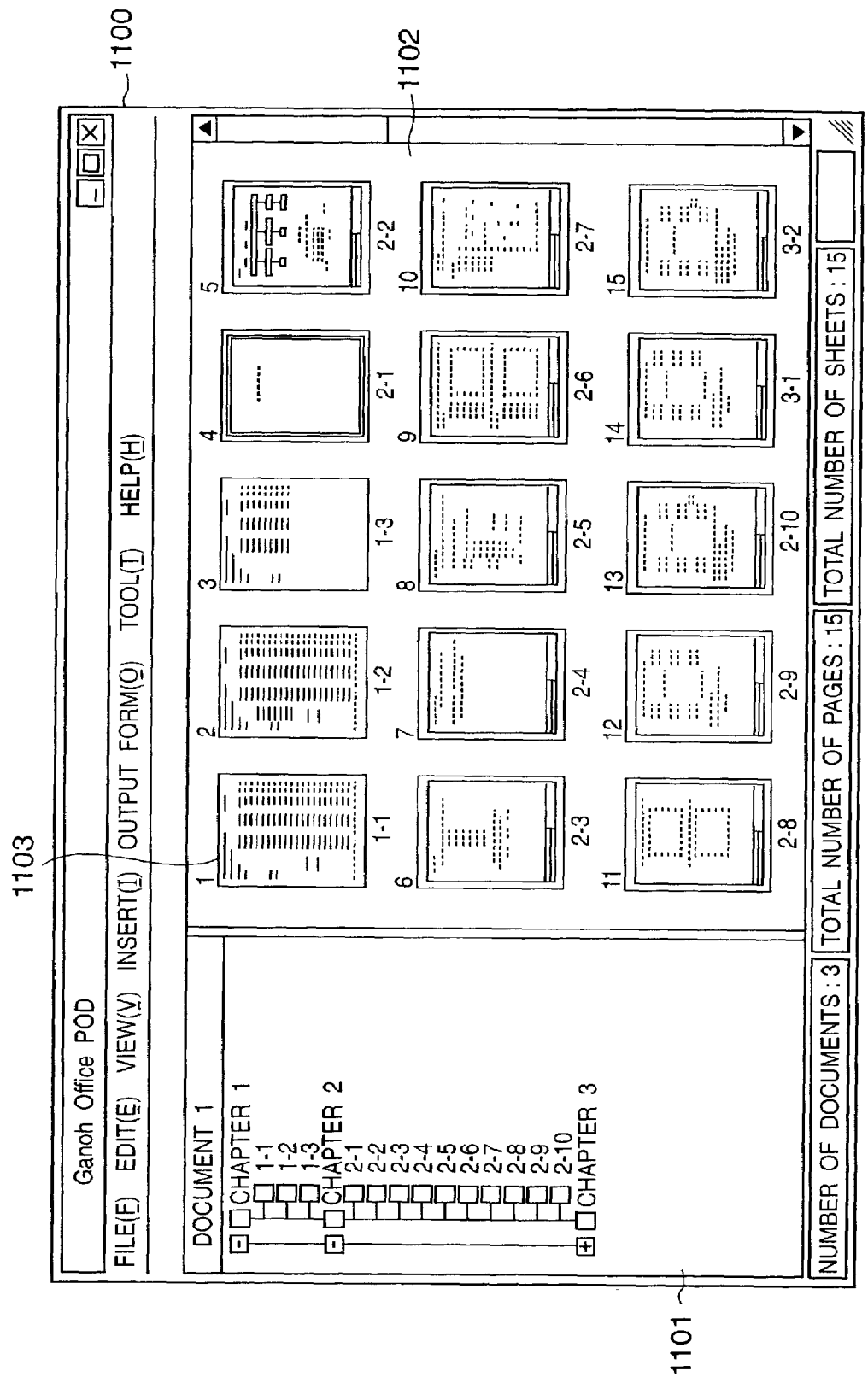
FIG. 10 is a diagram showing an example of a user interface screen for when an existing book file is opened.

In case of an already existing book file, on the other hand, the designated book file is opened (step S703) and the user interface (UI) screen is displayed in accordance with the structure, attributes and content of this book file. FIG. 10 shows an example of the UI screen 1100 that displays a book file designated from an existing book file. The UI screen 1100 includes a tree section 1101 illustrating the structure of a book and a preview section 1102 for displaying the printed state. A tree structure in which the chapters included in the book and the pages included in each chapter are as shown in FIG. 3A is illustrated in the tree section 1101. The pages displayed in the tree section 1101 are manuscript pages. The content of printed pages is displayed in reduced size in the preview section 1102. The order in which the printed pages are displayed reflects the book structure.

Application data that has been converted to an electronic manuscript file by the electronic manuscript writer 102 can be added to the opened book file as a new chapter. Such a function is referred to as an electronic manuscript import function. By importing an electronic manuscript to the book file newly opened by the procedure shown in FIG. 7, substance is given to the book file. This function is started by performing a drag-and-drop operation on application data on the screen of FIG. 10.

Figure 8:
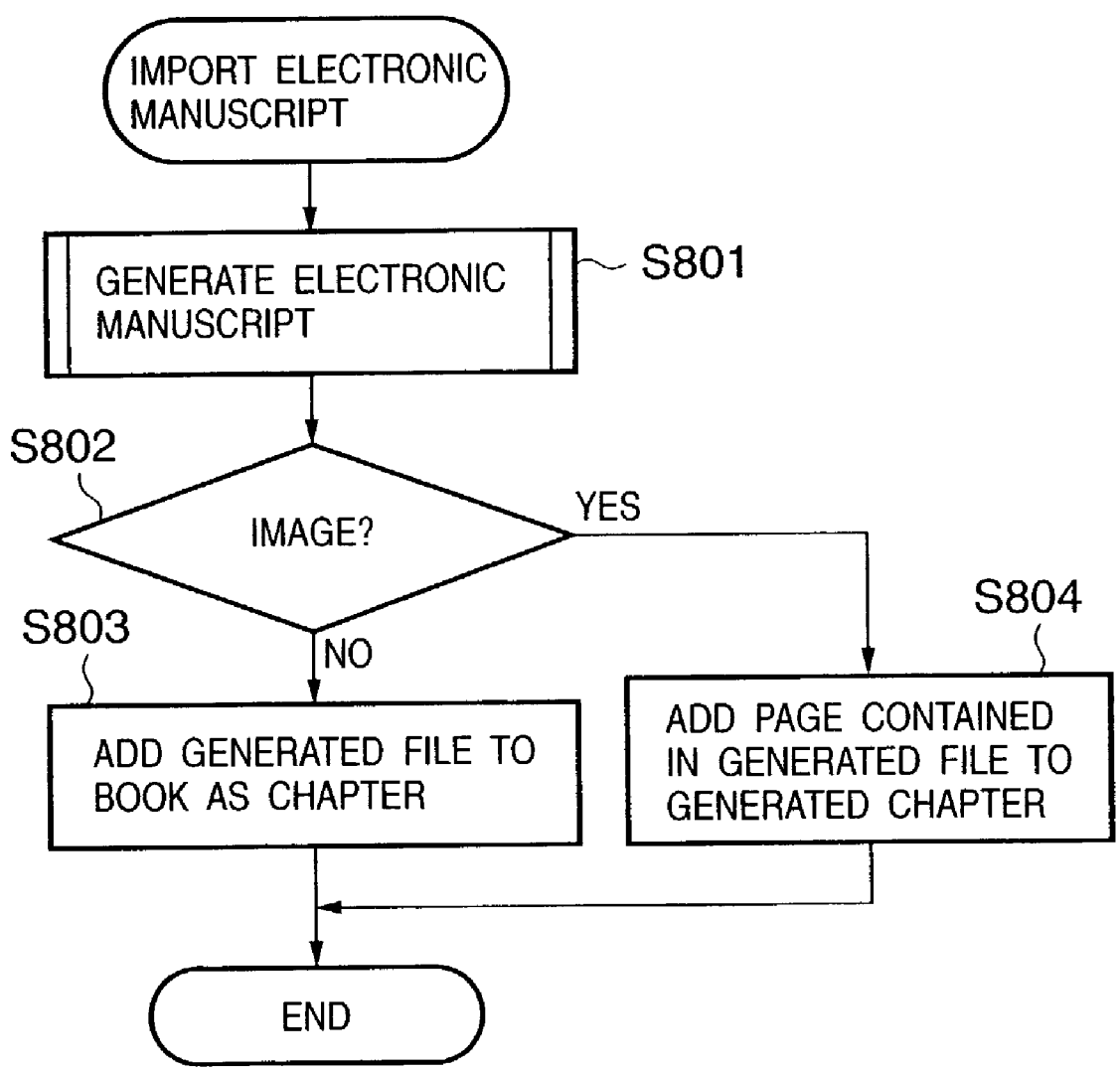
FIG. 8 is a flowchart of a procedure for importing an electronic manuscript file to a book file.

FIG. 8 illustrates a procedure for importing an electronic manuscript. The application program that generated the designated application data is launched, the electronic manuscript writer 102 is designated as the device driver and the application data is printed out, thereby effecting a conversion to electronic manuscript data (step S801). When the conversion is completed, it is determined whether the data obtained by the conversion is image data (step S802). This determination is carried out based upon the file extension of the application data if the operation is performed in the Windows OS environment. For example, it can be determined that the data is Windows bitmap data if the extension is "bmp", that the data is jpeg-compressed image data if the extension is "jpg", and that the data is tiff-formatted data if the extension is "tiff". Further, in case of such image data, it is possible to generate an electronic manuscript file from the image data directly without launching the application, as at step S801. This makes it possible to eliminate the processing of step S801.

If the data is not image data ("NO" at step S802), then the electronic manuscript file generated at step S801 is added as a new chapter to the book of the book file presently opened (step S803). As for the chapter attributes, the values of the book attributes are copied with regard to attributes shared in common with the book attributes. With regard to attributes that are not shared in common with the book attributes, the attributes are set to default values provided in advance.

If the data is image data ("YES" at step S802), a new chapter is not added on as a rule; rather, each manuscript page contained in the electronic manuscript file generated at step S801 is added to the chapter that has been specified (step S804). If the book file is a newly created file, however, a new chapter is created and each page of the electronic manuscript file is added on as a page that belongs to this chapter. With regard to a page attribute that is shared in common with an attribute of a higher layer, this attribute value is applied. With regard to an attribute, defined in an application file, that is handed over to the electronic manuscript file, this value is applied. For example, in a case where N-up or the like has been specified in application data, this attribute value is inherited. Thus, a new book file is created or a new chapter is added on.

Figure 9:
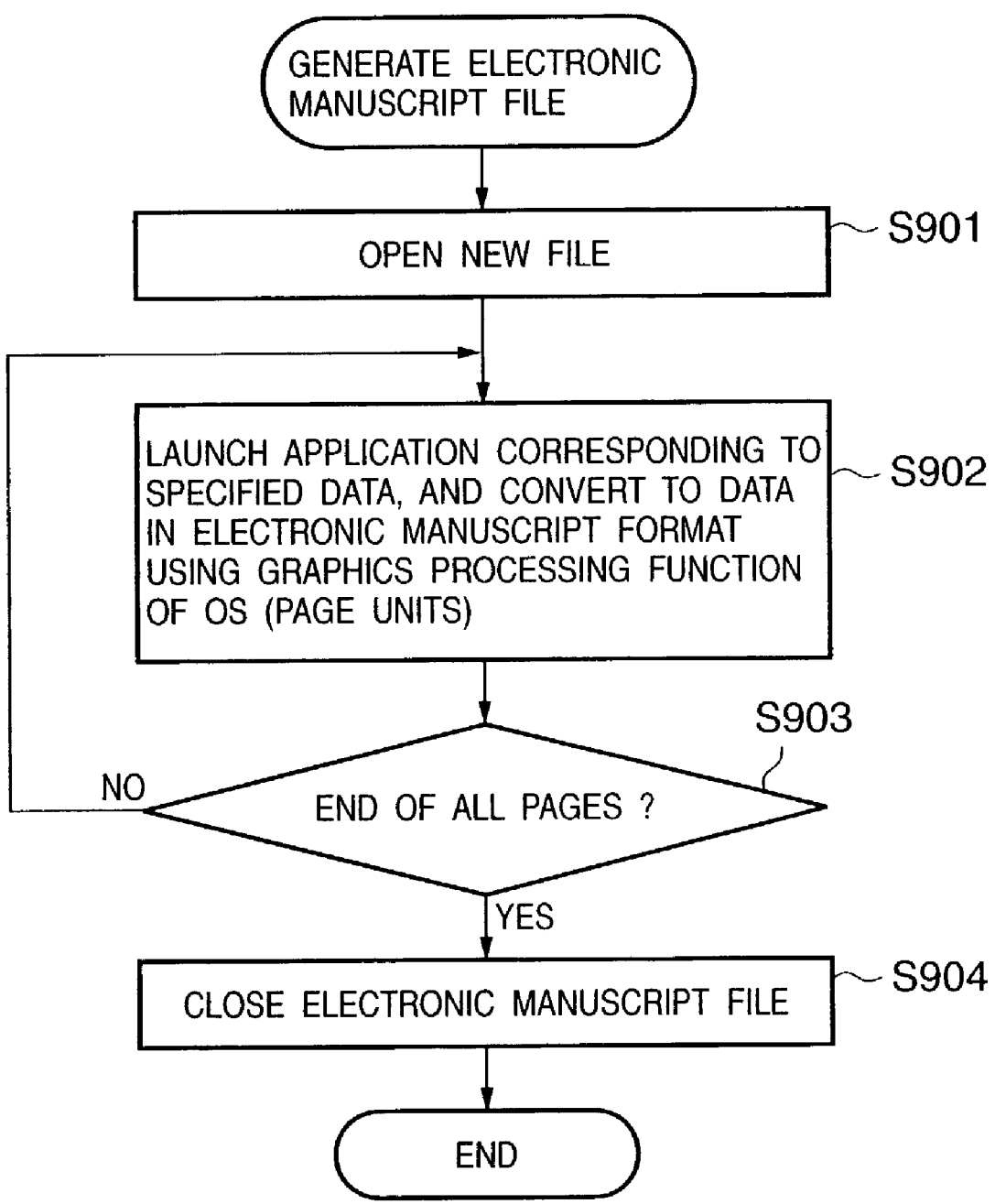
FIG. 9 is a flowchart of a procedure for converting application data to an electronic manuscript file.

FIG. 9 is a flowchart of a procedure for generating an electronic manuscript file by the electronic manuscript writer 102 at step S801 in FIG. 8. First, a new electronic manuscript file is generated and the file is opened (step S901). The application corresponding to the specified application data is launched and an output command is transmitted to the output module of the operating system with electronic manuscript writer 102 serving as the device driver. The output module converts the received output command to data having the electronic manuscript format by the electronic manuscript writer 102 and outputs the data (step S902). The output of the destination is the electronic manuscript file that was opened at step S901. It is determined whether the conversion of all specified data has been completed (step S903). If the answer is "YES", the electronic manuscript file is closed (step S904). The electronic manuscript file generated by the electronic manuscript writer 102 is a file that contains the substance of the manuscript page data shown in FIG. 3B.

<Editing of Book File>

A book file can be created from application data in the manner set forth above. With regard to a book file that has been generated, it is possible to apply the following editing operation to chapters and pages:

(1) new editing;
(2) deletion;
(3) copying;
(4) tearing off;
(5) pasting;
(6) moving;
(7) changing chapter title;
(8) reassigning page number and title;
(9) inserting front cover;
(10) inserting heavy stock;
(11) inserting tab stock; and
(12) laying out pages with regard to each manuscript page.

In addition, it is possible to perform an operation for cancelling an editing operation once the latter has been carried out, and an operation for reattempting the cancelled operation. These editing functions make it possible to perform various editing operations such as the combining of a plurality of book files, rearrangement of chapters and pages within a book file, deletion of chapters and pages within a book file, layout change of manuscript pages and insertion of heavy stock and tab stock. When these operations are performed, the results are reflected in the attributes shown in FIGS. 4A, 4B and 5 or are reflected in the structure of the book file. For example, if an operation for newly adding on a blank page is carried out, a blank page is inserted at a specified location. The blank page is handled as a manuscript page. If layout with regard to manuscript pages is changed, the specifics of the change are reflected in the printing method and in the attributes of N-up printing, front cover/back cover, tab stock, heavy stock and chapter break.

<Output of Book File>

A book file created and edited as set forth above has print-out as its end purpose. Accordingly, when the user selects a file menu from the UI screen 1100 of the book-making application shown in FIG. 10 and selects printing from this menu, print-out is performed by the specified output device. At this time, first the bookbinding application 104 creates a job ticket from the currently open book file and then delivers the job ticket to the electronic manuscript despooler 105. The latter converts the job ticket to an output command of the operating system, e.g., to a GDI function in the Windows system, and transmits this to an output module, e.g., a GDI. The output module generates a command, which is suited to the device, by the specified printer driver 106 and transmits this command to the device.

Here the job ticket is data having a structure in which the manuscript page is the minimum unit. The structure of the job ticket defines the layout of manuscript pages on paper. One job ticket is issued per job. As a consequence, first the highest level has a node that is a document, and attributes of the overall document, e.g., double-sided printing/single-sided printing, etc., have been defined. Underlying this is a paper node, and this includes attributes such as the identifier of the paper to be used and designation of a paper-feed port in the printer. Belonging to each paper node is the node of a sheet printing on the paper. A printed page (physical page) belongs to each sheet. One physical page belongs to one sheet in case of single-sided printing, and two physical pages belong to one sheet in case of double-sided printing. Belonging to each physical page is a manuscript page disposed thereon. Layout of manuscript pages is included as an attribute of a physical page.

The electronic manuscript despooler 105 converts the above-mentioned job ticket to an output command delivered to the output module.

<Other System Configuration>

An overview of a document processing system according to this embodiment is as set forth above. Though this is a stand-alone system, a server-client system that is an extension of the above system also can create and edit a book file through a similar arrangement and procedure. The book file and print processing, however, are managed by servers.

Figure 12:
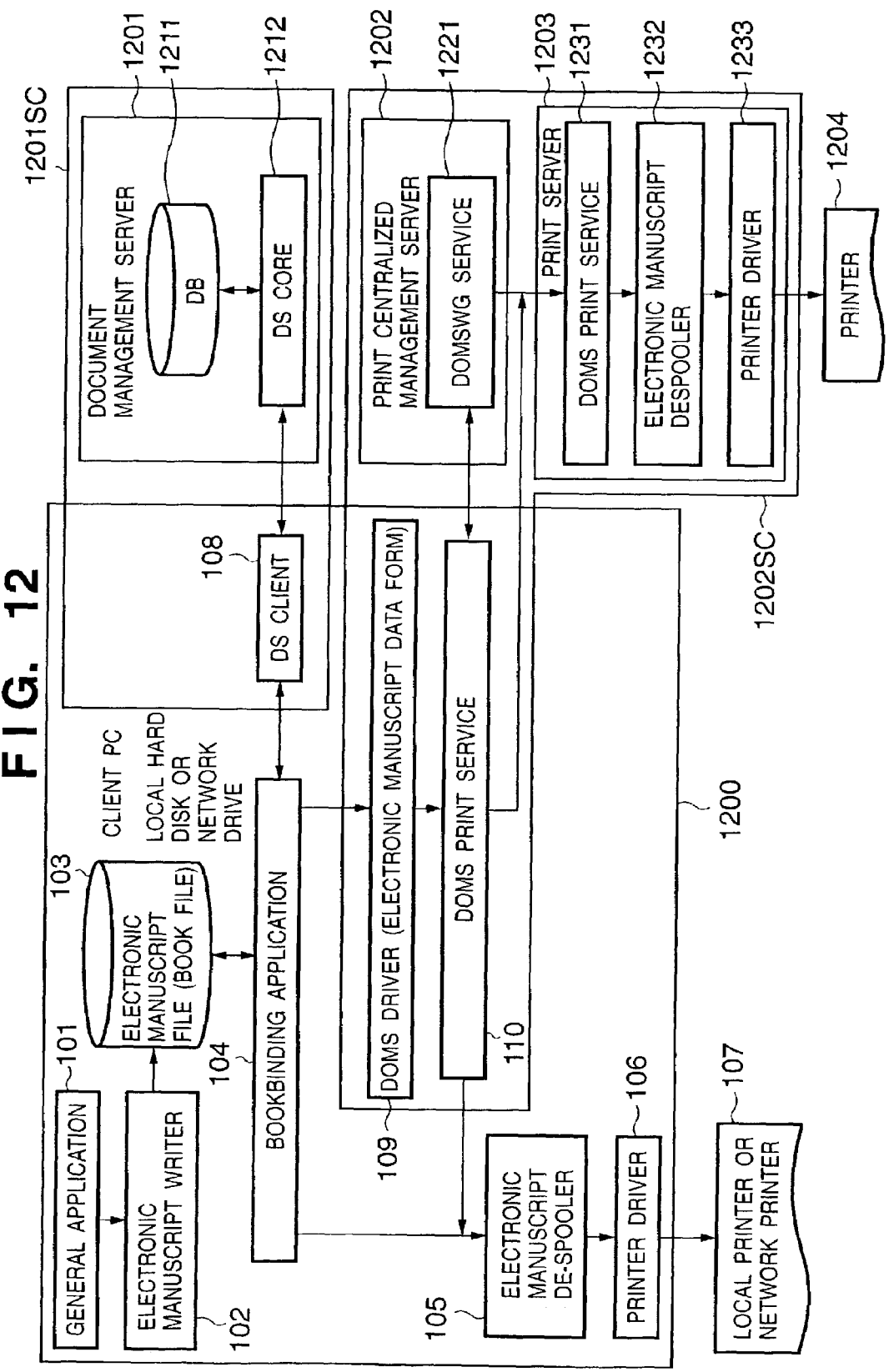
FIG. 12 is a block diagram of a client-server document processing system.

FIG. 12 is a block diagram illustrating the configuration of a client-server document processing system. A client document processing system is obtained by providing the stand-alone system with a DOMS (Document Output Management Service) driver 109, which is a client module, a DOMS print service module 110 and a DS (document service) client module 108. A document management server 1201, a print centralized management server 1202 and a print server 1203 are connected to a client document processing system 1200. These servers are connected to the client document processing system 1200 by an ordinary network. However, in a case where a server also functions simultaneously as a client, the server is connected by process-to-process communication that simulates communication with the network.

In the example shown in FIG. 12, the document management server 1201 and print centralized management server 1202 are both connected to the client. However, a case in which only one of these servers exists on the network is possible. For example, if the connected server is the document management server, then a document management server client system 1201SC that includes the client module 108 is added onto the stand-alone document management system. If the connected server is the print centralized management server 1202, then a print management server-client system 1202SC that includes the client module is added onto the stand-alone document management system.

The document management server 1201 is a server that stores a book file created and edited by the bookbinding application 104. In a case where the book file is managed by the document management server 1201, the book file is saved in a database 1211 of the document management server 1201 instead of the local hard disk of the client personal computer or in addition to the local hard disk. The saving and read-out of the book file between the bookbinding application 104 and document management server 1201 is carried out via the DS client module 108 and a DS core 1212.

The print centralized management server 1202 is a server for managing the printing of the book file that has been stored in the client document processing system 1200 or document management server 1201. A print request from the client is transmitted to a DOMSWG server module 1221 of the print centralized management server 1202 via the DOMS driver 109 and DOMS print service module 110. In a case where printing is performed by the printer of the client, the print centralized management server 1202 delivers electronic manuscript data to the electronic manuscript despooler 105 via the DOMS print service module 110 of the client. In a case where printing is performed by the print server 1203, the print centralized management server 1202 transmits the electronic manuscript data to a DOMS print service module 1231 in the print server 1203. The print centralized management server 1202 subjects a saved book file, for example, to a security check with regard to the qualifications of the user who issues the print request, and saves a log of print processing. Thus, the document processing system is capable of being implemented as a stand-along system or client-server system.

<Content of Preview Display>

When a book file is opened by a bookbinding application, the UI screen 1100 shown in FIG. 10 is displayed, as already described. A tree indicating the structure of the opened book (referred to as the "book of interest" below) is displayed in the tree section 1101. The user is capable of designating three display methods for the preview section. The first is a mode, which is referred to as "manuscript view", for displaying a manuscript page as is. In the manuscript view mode, the content of a manuscript page that belongs to the book of interest is displayed in reduced size. It should be noted that layout is not reflected in the display of the preview section 1102. The second is a print view mode. In the print view mode, a manuscript page is displayed in the preview section 1102 in a form in which the layout of the manuscript page is reflected. The third is a simple print view mode. In the simple print view mode, the content of each manuscript page is not reflected in the display of the preview section; only layout is reflected.

Figure 13:
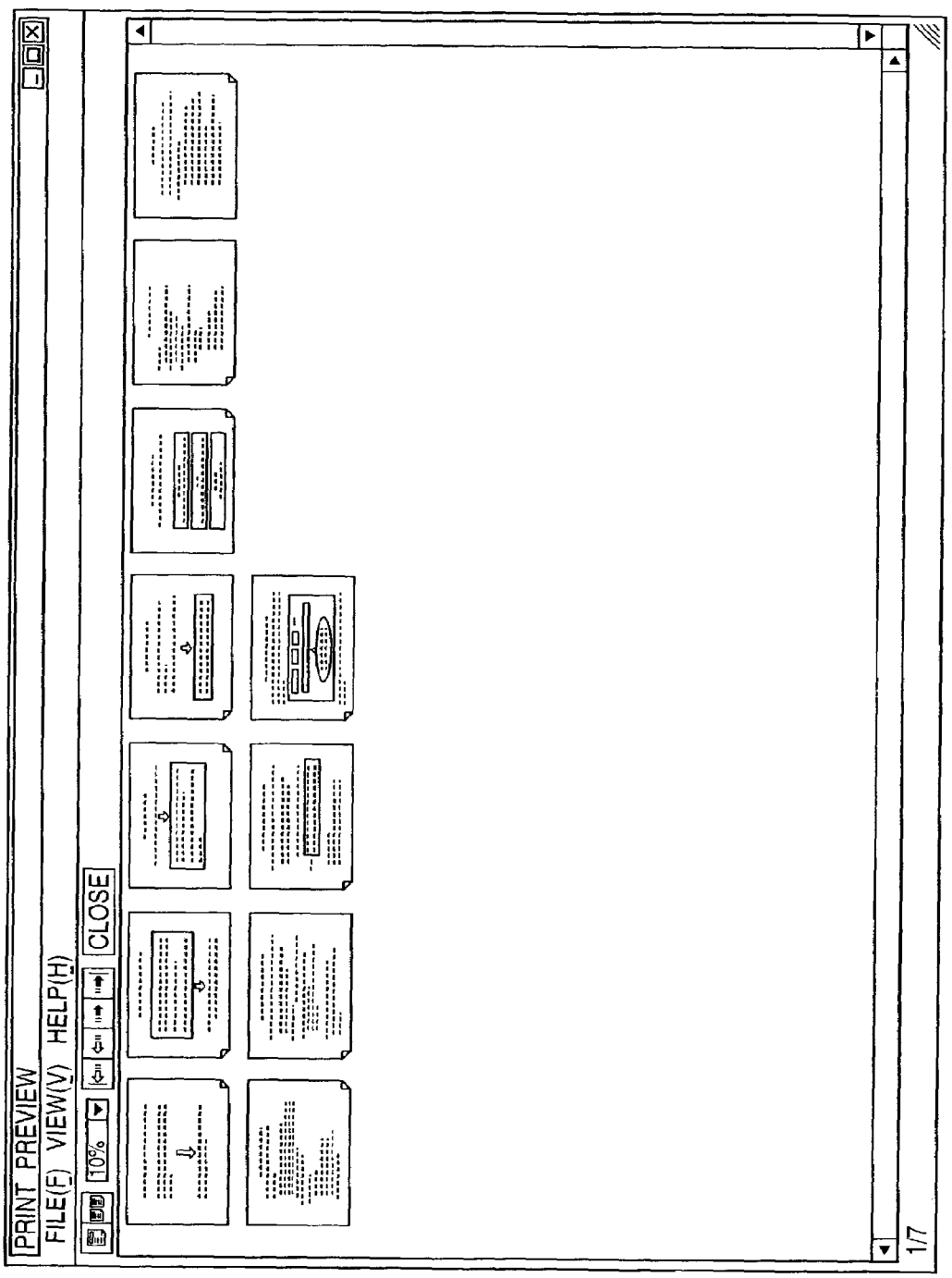
FIG. 13 is a diagram illustrating a problem with a preview display in a print view mode.

In other words, in the above-described manuscript view mode, a preview that reflects various print settings, such as double-sided printing and bookbinding printing, is not implemented. Further, though a preview display that reflects double-sided printing and bookbinding printing is presented, as in the above-described print view mode, the front side and back side of page are difficult to distinguish from each other at a glance, as shown in FIG. 13, and which page should be set as the front or back side cannot be distinguished.

Figure 14:
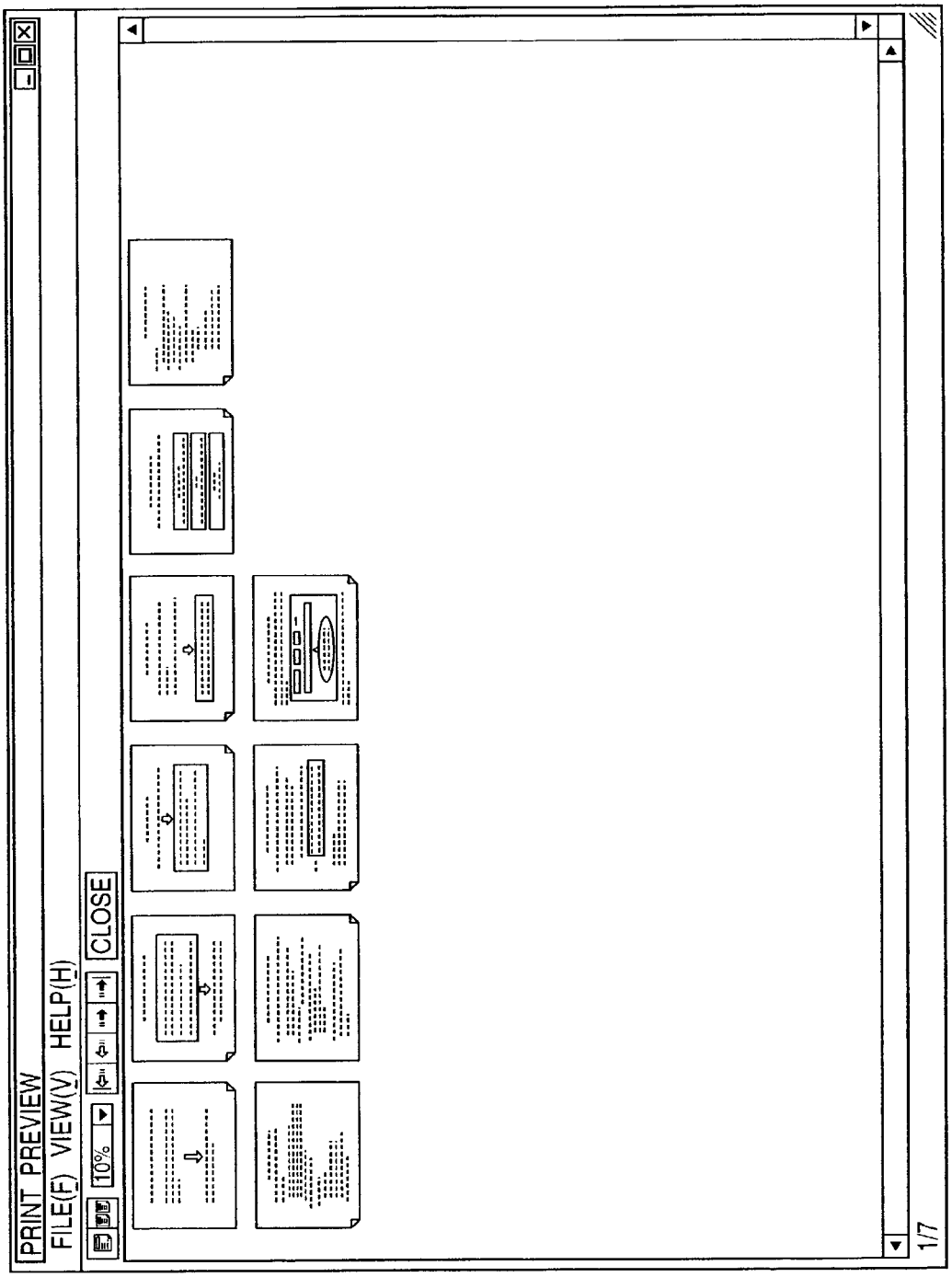
FIG. 14 is a diagram illustrating a problem with a preview display in a print view mode.

Further, in a case where double-sided printing has been set in the print view node, too much space is left at the upper right-hand corner of the display, as shown in FIG. 14, because of the front and back pages are displayed in sets.

<Preview Display when Double-Sided Printing is Performed>

Described next will be a method of presenting a preview display in such a manner that the front and back pages can be distinguished from each other at a glance by adopting different methods for displaying the front and back pages.

<Preview Display for Making Front/Back Pages Distinguishable>

Figure 15:
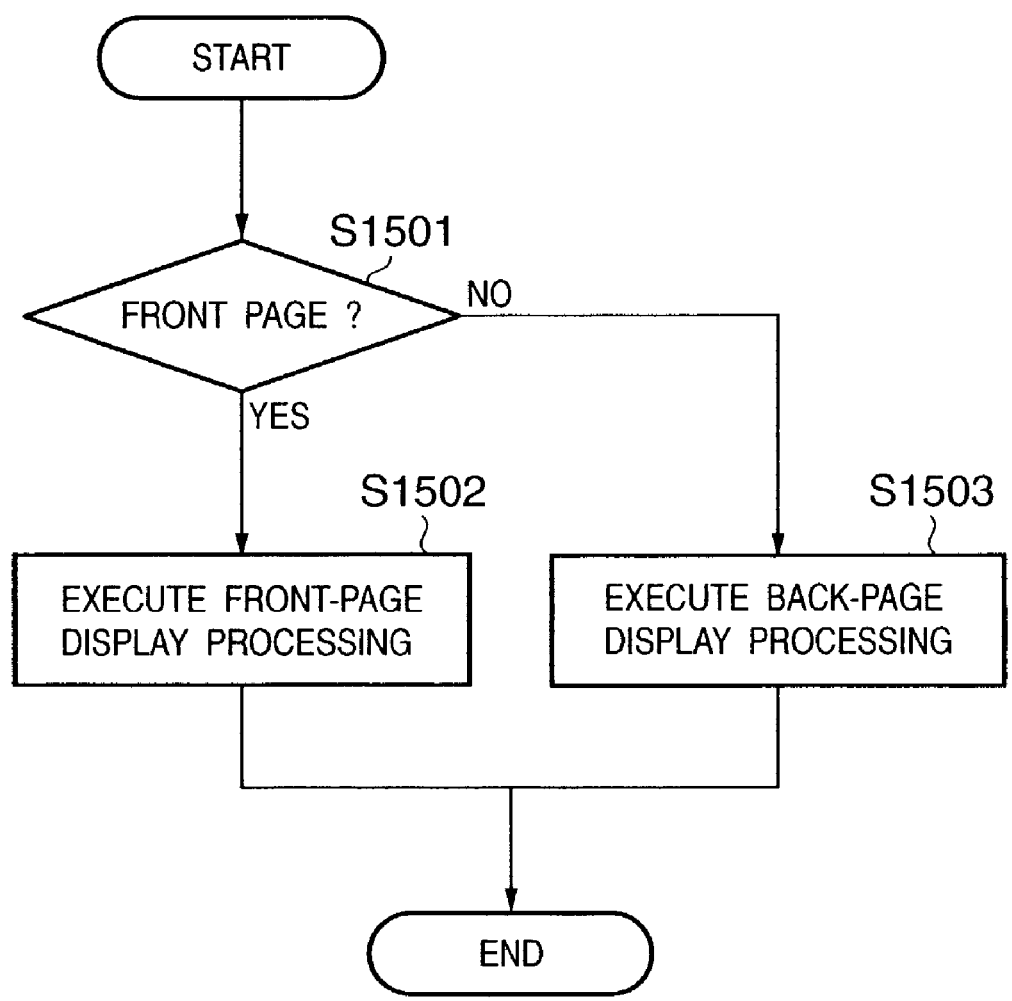
FIG. 15 is a flowchart illustrating processing in a case where a preview display is presented using different display formats for the front and back sides of a certain page.

FIG. 15 is a flowchart illustrating processing in which the bookbinding application 104 presents a preview display by adopting different display formats for the front and back sides of a certain page using the print preview function. In a case where the bookbinding application 104 presents a preview display upon opening a document file, first the bookbinding application 104 determines whether the page to be displayed is the front page or back page at step S1501. If the page is the front page ("YES" at step S1501), control proceeds to step S1502 and the bookbinding application 104 executes processing for displaying the front page. If the page is the back page ("NO" at step S1501), control proceeds to step S1503 and the bookbinding application 104 executes processing for displaying the back page.

Thus, by using display processing for the front page that differs from display processing for the back page, a preview display can be presented such that the difference between front and back pages can be understood at a glance.

Figure 16:
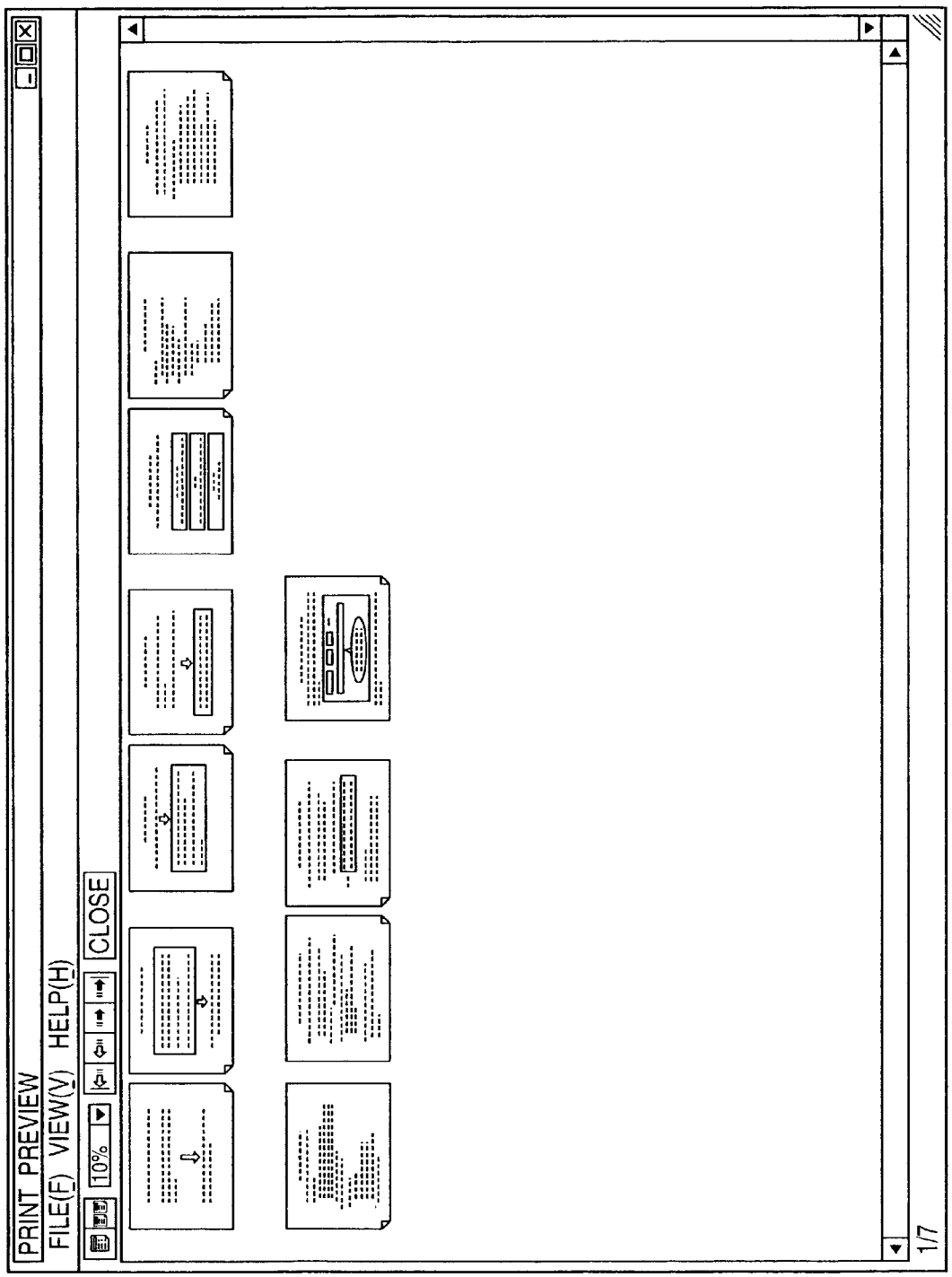
FIG. 16 is a diagram illustrating an example of a preview display using the processing method shown in FIG. 15.

FIG. 16 is a diagram illustrating an example of a preview display using the above-described processing method shown. In the example shown in FIG. 16, the spacing between front and back pages is made narrower than usual, thereby clearly displaying the fact that the front and back form a pair. The example of FIG. 16 illustrates only the manuscript pages displayed in the preview section 1102. However, it is also possible to display these pages together with the tree section 1101.

Further, since front/back is discriminated page by page at step S1501 in FIG. 15, this can also be applied to a case where printing is not performed in the usual order, namely in which the front page is followed by the back page. For example, this can be applied to a case where, when a back page is blank, the next front page is printed in its place.

Described next will be processing for a case where N-number of pages are to be displayed in the display processing of FIG. 15.

Figure 17:
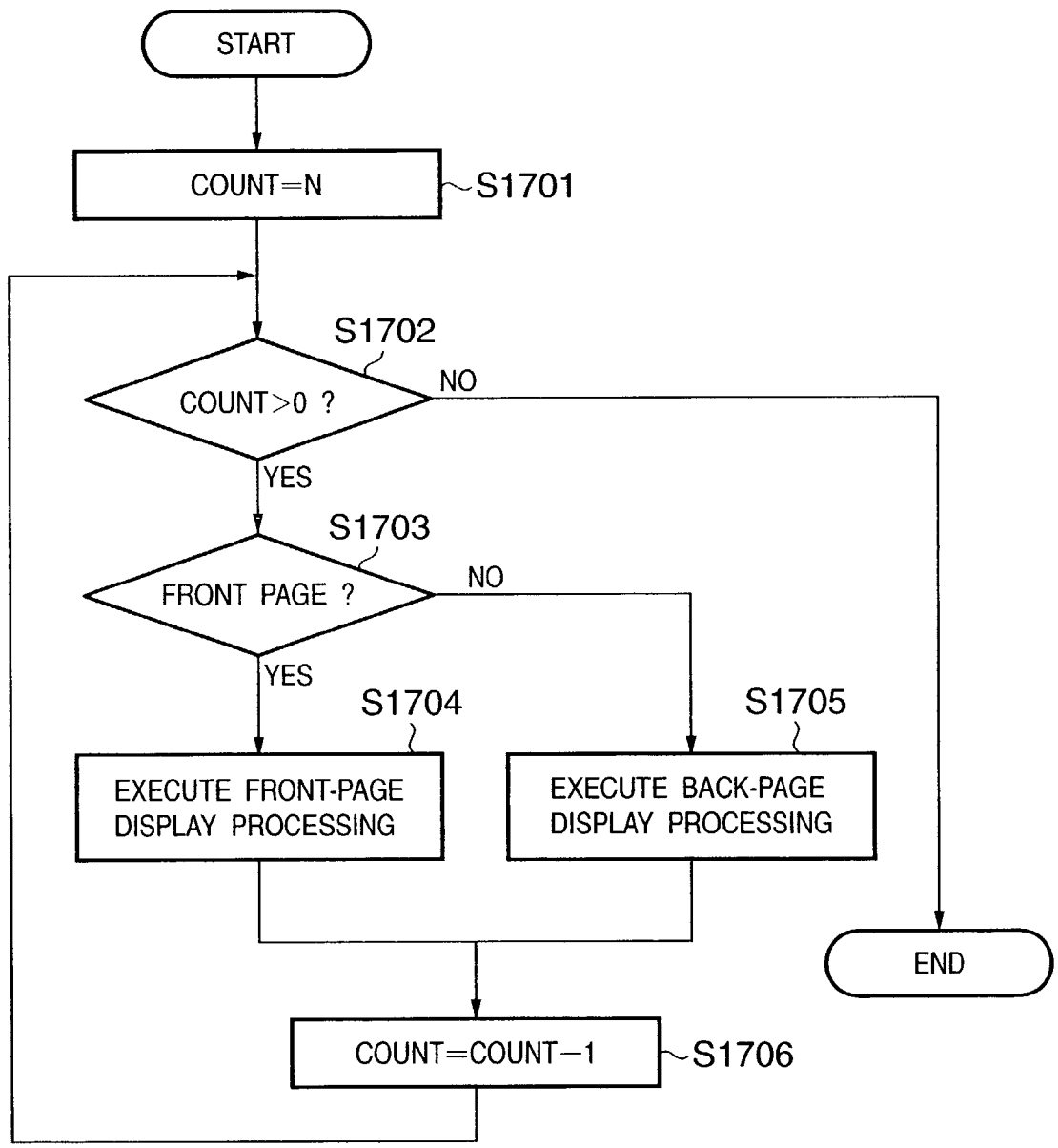
FIG. 17 is a flowchart illustrating processing for displaying N pages.

FIG. 17 is a flowchart illustrating processing for displaying N-number of pages using the print preview function. First, at step S1701, the bookbinding application 104 sets an initial value to an index (Count) for counting N-number of pages. Next, at step S1702, the bookbinding application 104 determines whether all pages have been displayed. If Count>0 holds, i.e., if all pages are not being displayed, control proceeds to-step S1703 and the bookbinding application 104 determines whether the page is the front page. If the page is the front page ("YES" at step S1703), control proceeds to step S1704 and the bookbinding application 104 executes processing for displaying the front page. If the page is the back page ("NO" at step S1703), control proceeds to step S1705 and the bookbinding application 104 executes processing for displaying the back page. The index Count is decremented by 1 at step S1706 whenever one page is displayed, and control returns to step S1702. This display processing is repeated until Count becomes zero.

Further, besides presenting the above-mentioned preview display, the bookbinding application 104 presents the display position of the back page one tier lower than that of the front page. By adopting this expedient, the user who observes the print preview screen can tell immediately which page is the front page and which page is the back page. This processing will be described with reference to FIG. 18.

Figure 18:
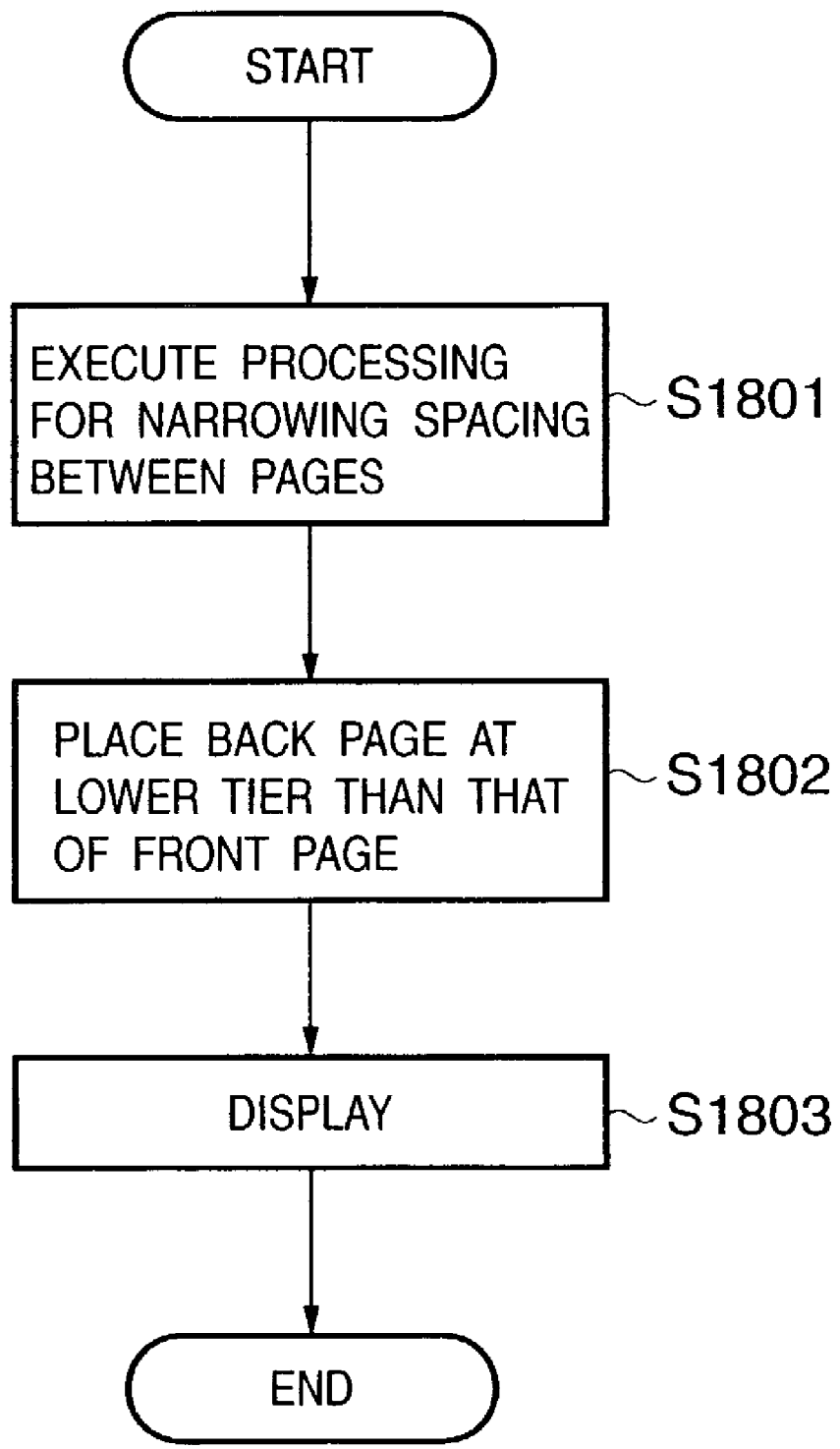
FIG. 18 is a flowchart illustrating processing for a preview display of a back page.

FIG. 18 is a flowchart illustrating processing executed by the bookbinding application 104 to present a preview display of a back page using the print preview function. First, at step S1801, the bookbinding application 104 sets the spacing between pages to be narrower than usual with regard to a pair of front and back pages. This is followed by step S1802, at which the bookbinding application 104 sets the display position of the back page to be one tier lower than that of the front page. Then, at step S1803, the bookbinding application 104 exercises control to output draw data to the operating system based upon the display information that has been set and to display this data via the operating system.

By adopting this arrangement, sets of front and back pages can be ascertained easily and it is also possible to readily distinguish between a front page and a back page.

<Preview Display Making Effective Utilization of Display Area>

Described next will be a method of presenting a preview display that utilizes effectively the display area that presents the preview display.

Preview processing described in this embodiment includes processing for switching between a mode in which a preview display is presented of front and back pages as a set and a mode in which front and back pages are displayed independently in a preview display for a case where double-sided printing has been set.

Figure 19:
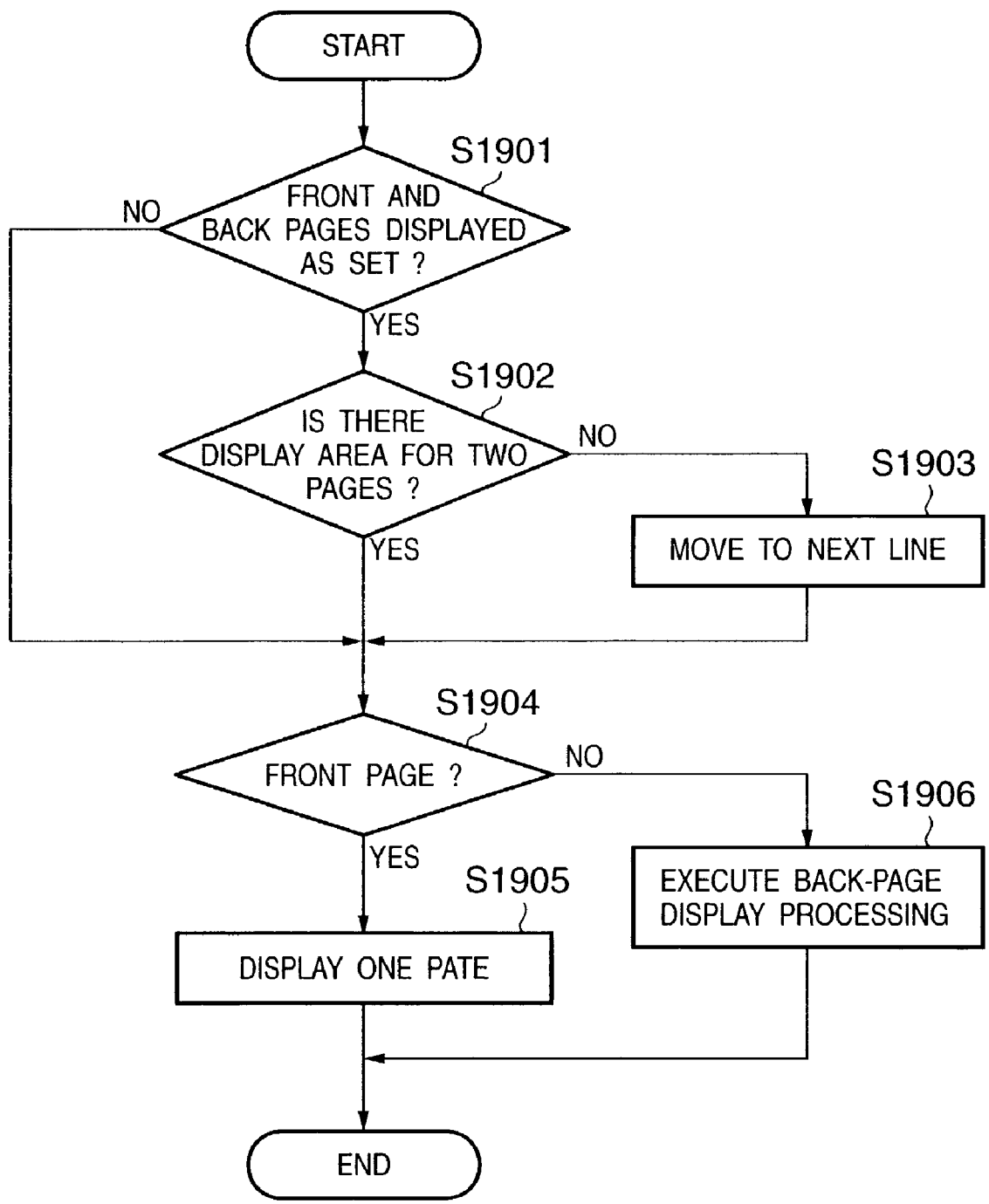
FIG. 19 is a flowchart illustrating preview display processing when double-sided printing is set.

FIG. 19 is a flowchart illustrating preview display processing when doubled-sided printing is set in the bookbinding application 104. This processing assumes that doubled-sided printing has been specified by detailed setting of print preview in the bookbinding application 104. If double-sided printing has been specified, the bookbinding application 104 determines at step S1901 whether the prevailing mode at the time of the doubled-sided print setting is that in which front and back pages are displayed as a set. If the mode in which front and back pages are displayed as a set has been set, control proceeds to step S1902, at which the bookbinding application 104 determines whether the display area has an area for displaying the two pages constituting the front and back pages. If an area for displaying two pages does not exist, control proceeds to step S1903, at which the bookbinding application 104 performs control so as to display the pages on the next line. Next, at step S1904, the bookbinding application 104 determines whether the page is the front page. If the page is the front page ("YES" at step S1904), control proceeds to step S1905 and the bookbinding application 104 executes processing for displaying the front page. If the page is the back page ("NO" at step S1904), control proceeds to step S1906 and the bookbinding application 104 executes processing for displaying the back page.

Figure 20:
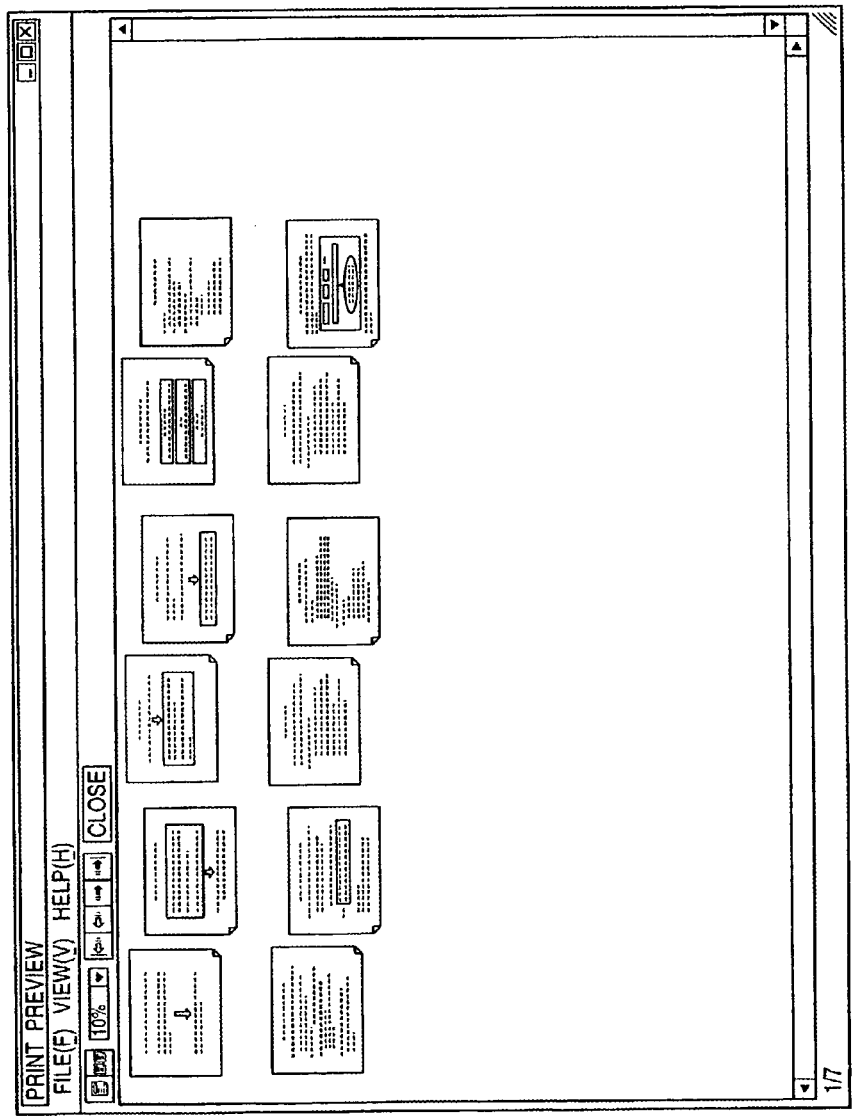
FIG. 20 is a diagram showing results of a preview display when double-sided printing is set in this embodiment.

Thus, if an area for displaying two pages does not exist in a case where the mode for displaying front and page pages as one set has been set, then the display of these pages is presented on the next line, as shown in FIG. 20. This makes it possible to present a display in which it is easy to recognize a set of front and page pages.

If it is found at step S1902 that an area for displaying two pages does exist, then control proceeds to step S1904 and the bookbinding application 104 executes the above-described display processing for this display area without moving to the next line.

Figure 21:
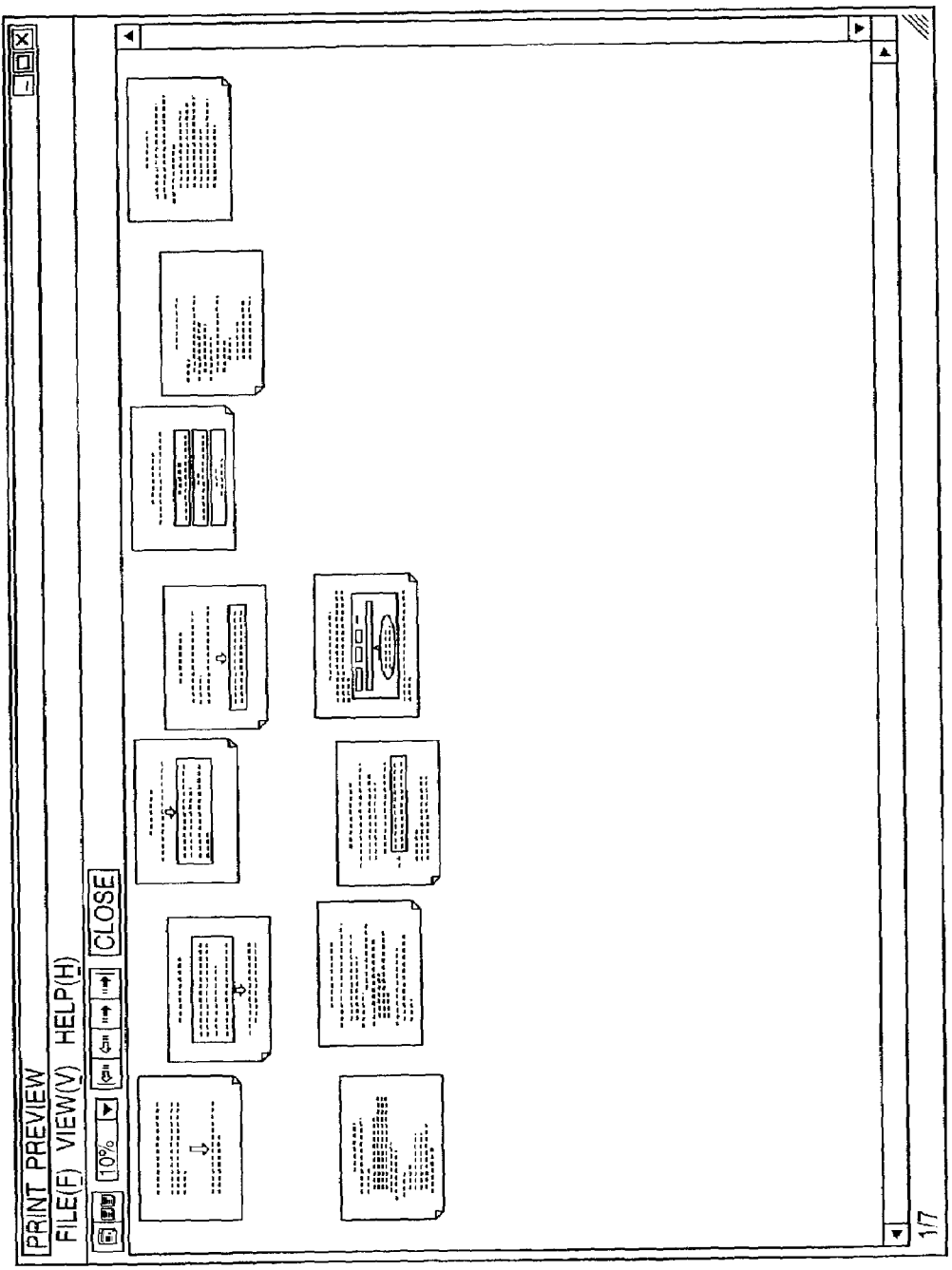
FIG. 21 is a diagram showing results of a preview display when double-sided printing is set in this embodiment.

If it is found at step S1901 that the mode for displaying front and page pages independently has been set at the time of the double-sided print setting, then the processing of step S1902 is skipped and control proceeds to step S1904, where the above-described display processing is executed. In this case, sets of front and page pages are not displayed but the preview display area can be utilized effectively, as illustrated in FIG. 21.

By executing processing in this fashion, it is possible to deal with both a case where it is desired to present a preview display of sets of front and back pages and a case where it is desired to utilize a preview display area effectively at the time of the double-sided print setting.

Thus, in accordance with this embodiment, as described above, front and back pages are displayed with the spacing between them narrowed if double-sided printing has been specified. This has the effect of enabling a set of front and back pages to be recognized with ease. Further, in a case where doubled-sided printing has been specified, front and back pages are displayed in preview on different tiers. If double-sided printing has been designated, therefore, front and back pages can be distinguished from each other at a glance.

Further, when a preview display is presented at the time of the double-sided print setting, it is possible to select a mode for presenting a preview display of front and back pages on one line of the preview area, and a mode for presenting a preview display in which the front and back pages are displayed independently on one line. As a result, it is possible to avoid leaving needless blank spaces in the preview display area. Another effect is that the preview display area can be utilized effectively.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes.

In this case, the program codes read from the storage medium implement the novel functions of the embodiment and the storage medium storing the program codes constitutes the invention.

Examples of storage media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

Thus, in accordance with the illustrated embodiment as described above, it is possible to present a preview display so adapted that the front and back sides of a page can be ascertained at a single glance before printing is performed.

Further, the display area can be utilized effectively by presenting a preview display in which switching is performed between a mode for displaying sets of front and back pages on one line of the display area and a mode for displaying the front and back pages independently on one line of the display area.

As many apparently widely different embodiments of the present invention can be made without departing from the spirit and scope thereof, it is to be understood that the invention is not limited to the specific embodiments thereof except as defined in the appended claims.

What is claimed is:

1. An information processing system having a print preview function for displaying a preview of a printed state of a document comprised of a plurality of pages before the document is printed, comprising:
 a user interface for receiving a setting of various print functions for a document;
 selection means for selecting one preview mode from at least first and second preview modes, wherein the first preview mode does not reflect the set print functions and the second preview mode reflects the set print functions when each page of the document is displayed on a display area; and
 display control means for controlling to display such that, in a case where the first preview mode is selected by said selection means, a preview of each page of the document indicating actual contents of each page is displayed on the display area using thumbnails without reflecting the print functions, and such that in a case where a double-sided printing function setting has been received by said user interface and the second preview mode is selected by said selection means, previews of front and back sides of pages of the document to be printed indicating actual contents of each page are simultaneously displayed on the display area using thumbnails by reflecting the print functions, in such a manner That the front and back sides of pages can be distinguished from each other by the positioning of the previews of the front and back sides of pages relative to one another.

2. The system according to claim 1, wherein said display control means displays a preview of the front and back sides of pages with spacing between them narrowed in such a manner that pairs of front and back sides of pages may be recognized at a glance when a preview of front and back sides of pages is displayed.

3. The system according to claim 1, wherein said display control means displays a preview of the front and back sides of pages with display positions thereof made different from each other in such a manner that pairs of front and back sides of pages may be recognized at a glance when a preview of all pages to be printed is displayed.

4. The system according to claim 1, further comprising determination means for determining whether or not a predetermined area exists for displaying front and back sides of pages as a same line in the display area,
 wherein said display control means displays the front and back sides of pages on the same line in a case where it is determined that the predetermined area exists, or displays the front and back sides of pages on a next line of the display area in a case where it is determined that the predetermined area does not exist.

5. A display method for displaying a preview of a printed state of a document comprised of a plurality of pages before the document is printed, comprising:
 a setting step of receiving a setting of various print functions for a document;
 a selection step of selecting one preview mode from at least first and second preview modes, wherein the first preview mode does not reflect the set print functions and the second preview mode reflects the set print functions when each page of the document is displayed on a display area; and
 a display control step of controlling to display such that, in a case where the first preview mode is selected at said selection step, a preview of each page of the document indicating actual contents of each page is displayed on the display area using thumbnails without reflecting the print functions, and such that in a case where a double-sided printing function setting has been received at said setting step and the second preview mode is selected at said selection step, previews of front and back sides of pages of the document to be printed indicating actual contents of each page are simultaneously displayed on the display area using thumbnails by reflecting the print functions, in such a manner that the front and back sides of pages can be distinguished from each other by the positioning of the previews of the front and back sides of pages relative to one another.

6. The method according to claim 5, wherein a preview of the front and back sides of pages is displayed with spacing between them narrowed in such a manner that pairs of front and back sides of pages may be recognized at a glance when a preview of front and back sides of pages is displayed.

7. The method according to claim 5, wherein a preview of the front and back sides of pages is displayed with display positions thereof made different from each other in such a manner that pairs of front and back sides of pages may be recognized at a glance when a preview of all pages to be printed is displayed.

8. The method according to claim 5, further comprising a determination step of determining whether or not a predetermined area exists for displaying front and back sides of pages as a same line in the display area,
wherein the front and back sides of pages are displayed on the same line in a case where it is determined that the predetermined area exists, or the front and back sides of pages are displayed on a next line of the display area in a case where it is determined that the predetermined area does not exist.

9. A display control program in an information processing system having a print preview function fur displaying a preview of a printed state of a document comprised of a plurality of pages before the document is printed, said program causing a computer to execute;
a setting procedure for receiving a setting of various print functions for a document;
a selection procedure for selecting one preview mode from at least first and second preview modes, wherein the first preview mode does not reflect the set print functions and the second preview mode reflects the set print functions when each page of the document is displayed on a display area; and
a display control procedure for controlling to display such that, in a case where the first preview mode is selected at said selection procedure, a preview of each page of the document indicating actual contents of each page is displayed on the display area using thumbnails without reflecting the print functions, and such that in a case where a double-sided printing function setting has been received at said setting procedure and the second preview mode is selected at said selection procedure, previews of front and back sides of pages of the document to be printed indicating actual contents of each page are simultaneously displayed on the display area using thumbnails by reflecting the print functions, in such a manner that the front and back sides of pages can be distinguished from each other by the positioning of the previews of the front and back sides of pages relative to one another.

10. The program according to claim 9, wherein a preview of the front and back sides of pages is displayed with spacing between them narrowed in such a manner that pairs of front and back sides of pages may be recognized at a glance when a preview of front and bank sides of pages is displayed.

11. The program according to claim 9, wherein a preview of the front and back sides of pages is displayed with display positions thereof made different from each other in such a manner that pairs of front and back sides of pages may be recognized at a glance when a preview of all pages to be printed is displayed.

12. The program according to claim 9, further comprising a determination procedure for determining whether or not a predetermined area exists for displaying front and back sides of pages as a same line in the display area,
wherein the front and back sides of pages are displayed on the same line in a case where it is determined that the predetermined area exists, or the front and back sides of pages are displayed on a next line of the display area in a case where it is determined that the predetermined area does not exist.

13. A computer-readable recording medium on which a program as set forth in claim 9 has been recorded.

* * * * *

UNITED STATES PATENT AND TRADEMARK OFFICE
CERTIFICATE OF CORRECTION

PATENT NO. : 7,103,837 B2
APPLICATION NO. : 10/236972
DATED : September 5, 2006
INVENTOR(S) : Junko Sato It is certified that error appears in the above-identified patent and that said Letters Patent is hereby corrected as shown below:

DRAWINGS:
Sheet 20, Figure 19, "PATE" should read -- PAGE --.

COLUMN 7:
Line 19, "to printed" should read -- to be printed --; and
Line 61, "an items" should read -- an item --.

COLUMN 11:
Line 67, "along" should read -- alone --.

COLUMN 12:
Line 30, "view node," should read -- view mode, --.

COLUMN 13:
Line 17, "to-step" should read -- to step --;
Line 63, "doubled-sided" should read -- double-sided --; and
Line 64, "doubled-" should read -- double --.

COLUMN 14:
Line 2, "doubled-sided" should read -- double-sided --;
Lines 20, 31 and 35, "page pages" should read -- back pages --;
Line 24, "page pages." should read -- back pages. --.

COLUMN 16:
Line 5, "That" should read -- that --.

UNITED STATES PATENT AND TRADEMARK OFFICE
CERTIFICATE OF CORRECTION

PATENT NO. : 7,103,837 B2
APPLICATION NO. : 10/236972
DATED : September 5, 2006
INVENTOR(S) : Junko Sato It is certified that error appears in the above-identified patent and that said Letters Patent is hereby corrected as shown below:

COLUMN 18:
Line 14, "bank" should read -- back --.

Signed and Sealed this

Twenty-fifth Day of March, 2008

JON W. DUDAS
*Director of the United States Patent and Trademark Office*